US008022666B2

(12) United States Patent
Li

(10) Patent No.: US 8,022,666 B2
(45) Date of Patent: Sep. 20, 2011

(54) ELECTRIC PUBLIC TRANSIT SYSTEM
(75) Inventor: Gang Li, Lanzhou (CN)
(73) Assignee: Beijing Dianba Technology Co. Ltd., Haidian District, Beijing (CN)
( * ) Notice: Subject to any disclaimer, the term of this patent is extended or adjusted under 35 U.S.C. 154(b) by 828 days.
(21) Appl. No.: 10/562,136
(22) PCT Filed: Nov. 29, 2004
(86) PCT No.: PCT/CN2004/001373
§ 371 (c)(1),
(2), (4) Date: Apr. 14, 2008
(87) PCT Pub. No.: WO2006/050637
PCT Pub. Date: May 18, 2006

(65) Prior Publication Data
US 2008/0258682 A1 Oct. 23, 2008

(30) Foreign Application Priority Data
Nov. 11, 2004 (CN) .......................... 2004 1 0090796

(51) Int. Cl.
H02J 7/14 (2006.01)
H02J 7/00 (2006.01)
B65F 9/00 (2006.01)
B65G 1/00 (2006.01)
B65G 65/00 (2006.01)
E02D 27/00 (2006.01)
B66F 7/28 (2006.01)
B60K 1/04 (2006.01)
(52) U.S. Cl. ........ 320/109; 320/104; 414/809; 414/296; 414/288; 414/281; 52/169.7; 187/216; 187/217; 104/34
(58) Field of Classification Search .................. 320/107, 320/105, 109, 115; 296/25; 307/10.1; 414/269, 414/268, 294, 323, 288, 809, 398, 468, 471, 414/507, 512, 354, 356, 389, 281; 52/169.7; 104/34
See application file for complete search history.

(56) References Cited

U.S. PATENT DOCUMENTS
4,102,273 A * 7/1978 Merkle et al. ................... 104/34
(Continued)

FOREIGN PATENT DOCUMENTS
CN 1212933 A 4/1999
(Continued)

OTHER PUBLICATIONS
Examination Report dated Nov. 14, 2008 for corresponding Malaysian Application No. PI 20055294.
(Continued)

Primary Examiner — Edward Tso
Assistant Examiner — Alexis Boateng
(74) Attorney, Agent, or Firm — Ling Wu; Stephen Yang

(57) ABSTRACT

The present invention relates to an electric public transit system, comprising electric driven buses with a cassette battery set and bus-mounted control system, a charge station and a loading and unloading apparatus. When said bus needs change the cassette battery set, said loading and unloading apparatus takes said cassette battery set from said bus and then replace with a charged cassette battery set. Both said charge station and said loading and unloading apparatus are equipped with their control systems, respectively, which can intercommunicate with said bus-mounted control system. In the present invention, the cassette battery sets are charged during power consumption valleys of the power grid, and therefore, the transit system can save energy and benefit the environment. Additionally it is also fast and accurate for loading and unloading the cassette battery set in the system of the present invention, which can also guarantee the bus operating online continuously and greatly enhance the usage ratio of the bus.

27 Claims, 33 Drawing Sheets

U.S. PATENT DOCUMENTS

| | | | | |
|---|---|---|---|---|
| 5,187,423 A * | 2/1993 | Marton | | 320/109 |
| 5,349,535 A * | 9/1994 | Gupta | | 702/63 |
| 5,612,606 A * | 3/1997 | Guimarin et al. | | 320/109 |
| 5,927,938 A * | 7/1999 | Hammerslag | | 414/809 |
| 5,951,229 A * | 9/1999 | Hammerslag | | 414/398 |
| 5,952,813 A * | 9/1999 | Ochiai | | 320/104 |
| 5,998,963 A * | 12/1999 | Aarseth | | 320/109 |
| 6,094,028 A * | 7/2000 | Gu et al. | | 320/109 |
| 7,068,991 B2 * | 6/2006 | Parise | | 455/343.1 |
| 2003/0209375 A1* | 11/2003 | Suzuki et al. | | 180/65.3 |
| 2004/0142733 A1* | 7/2004 | Parise | | 455/572 |
| 2005/0002263 A1* | 1/2005 | Iwase et al. | | 365/230.03 |

FOREIGN PATENT DOCUMENTS

| | | |
|---|---|---|
| CN | 1467108 A | 1/2004 |
| EP | 0 693 813 | 1/1996 |
| EP | 1 810 869 | 7/2007 |
| FR | 2 830 801 | 4/2003 |
| JP | 10262303 A | 9/1998 |
| WO | WO 98/21132 | 5/1998 |
| WO | WO0066388 A | 11/2000 |

OTHER PUBLICATIONS

Supplementary European Search Report dated Nov. 4, 2009.
International Search Report.

* cited by examiner

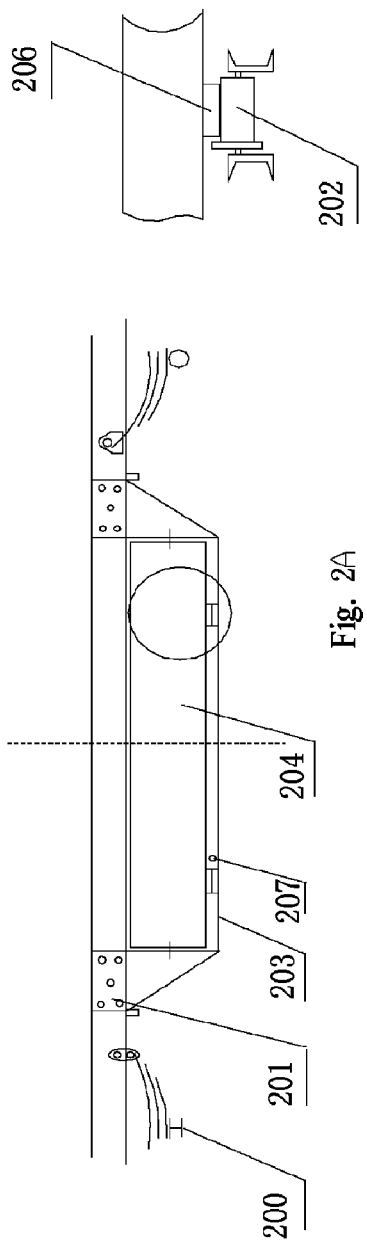
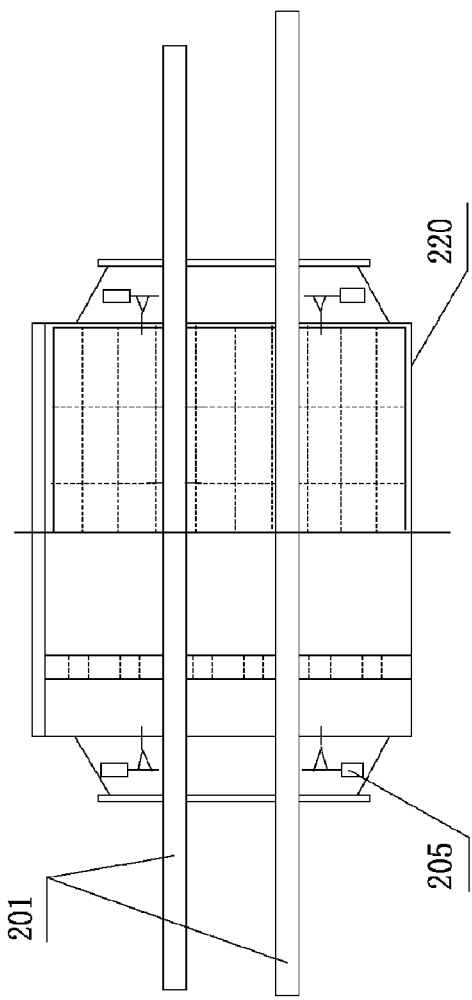

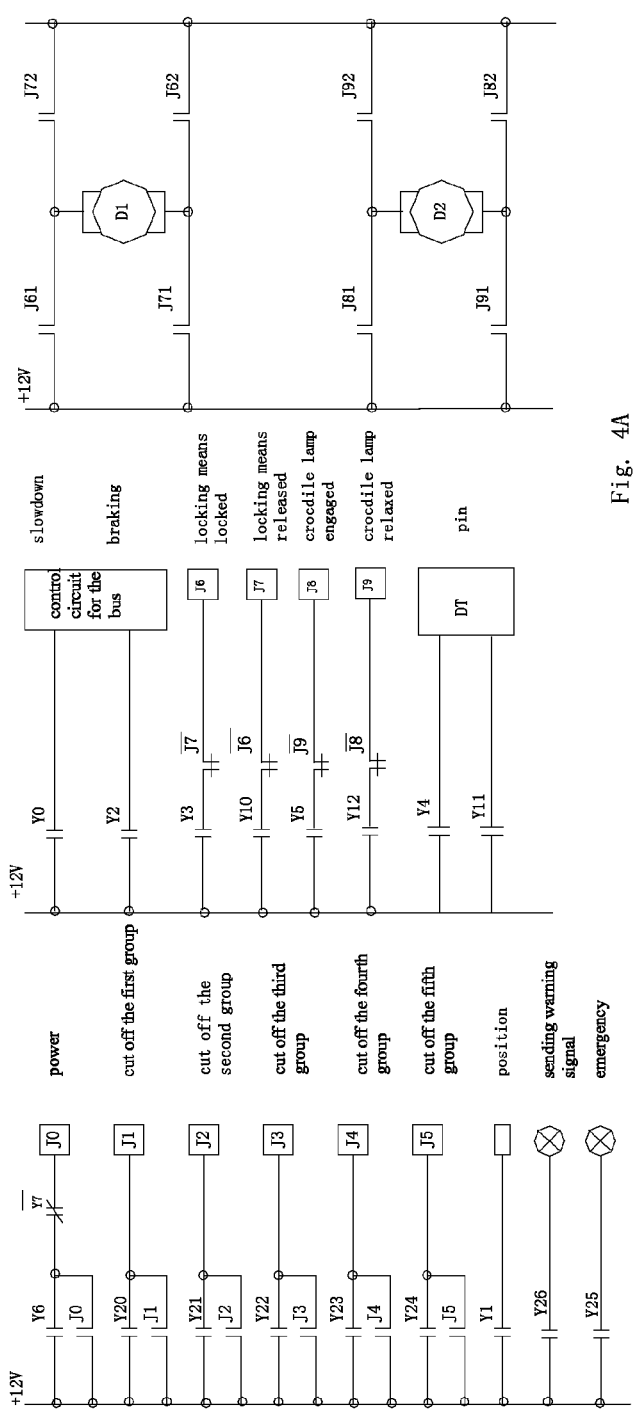
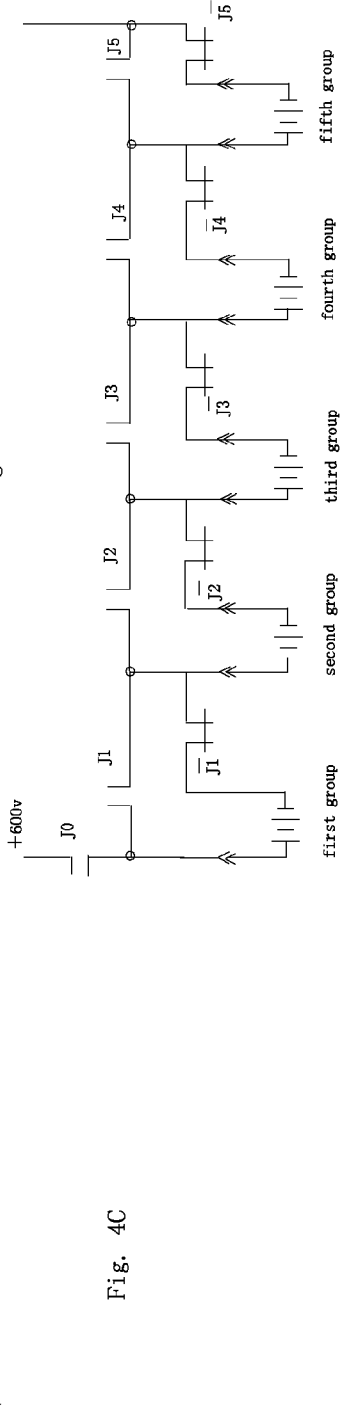
Fig. 4A
Fig. 4B
Fig. 4C layout diagram of merchenical arms sensors (47 points)

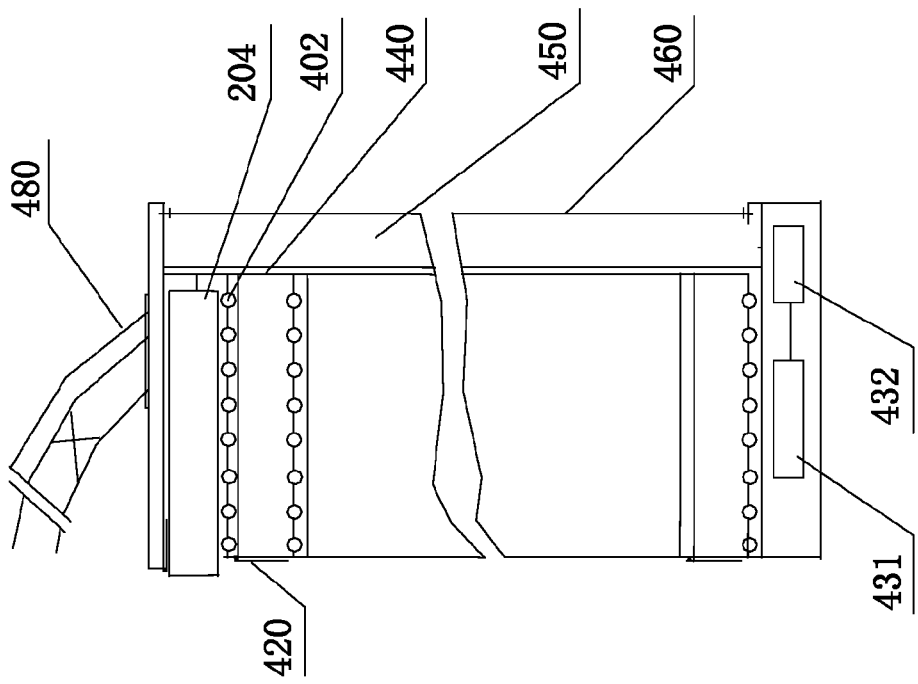
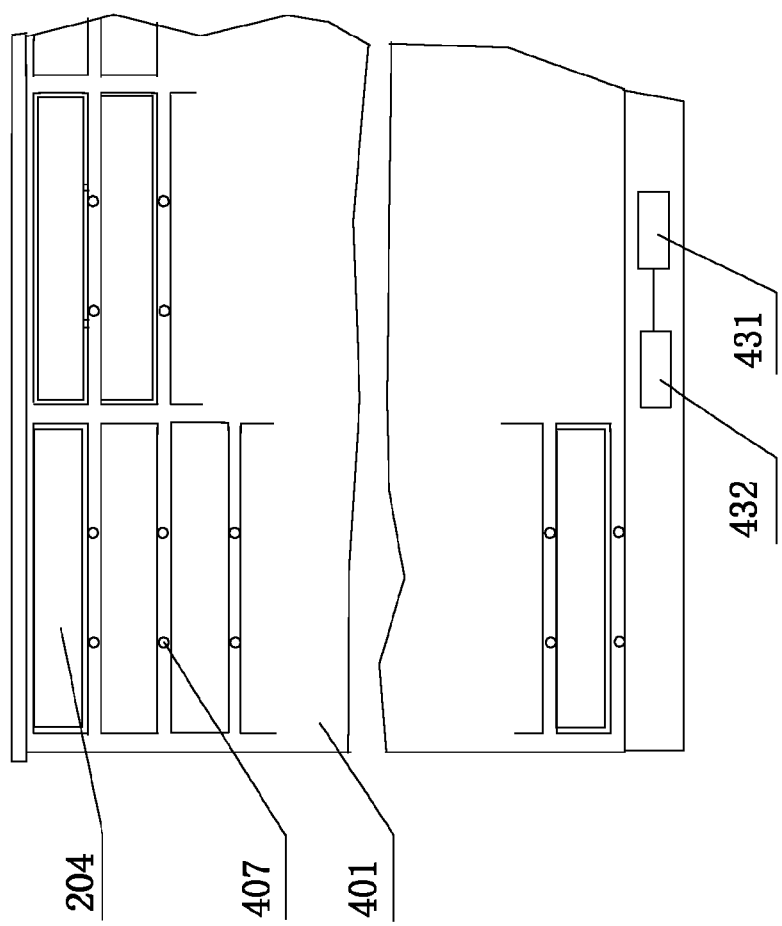
Fig. 19B
Fig. 19A

ELECTRIC PUBLIC TRANSIT SYSTEM

TECHNICAL FIELD OF THE INVENTION

The present invention relates to an electric public transit system, especially an electric transit system comprising an electric driven bus equipped with a cassette battery set and a bus-mounted control system, a loading and unloading apparatus, a charge station for charging cassette battery sets, and an urgent service system.

BACKGROUND OF THE INVENTION

As the petroleum crisis and the environmental pollution become worse, in recent years more new vehicles are designed with energy-conservation and environmental protection and tried to substitute petrol or diesel vehicles, for example, vehicles with natural gas, hydrogen, or methyl alcohol as fuel, or with fuel cell, solar energy, electric or multi-fuel, etc. As overall performance is concerned, an electric vehicle is the outstanding one among them, which is a new type of transportation means that could possibly substitute "the internal-combustion engine". At present, many countries in the world have put a lot of effort and resources to research and develop electric vehicles. Some advanced automobile countries, such as USA, Japan and Germany, guide the direction in research and development on electric vehicles. Some governments try to promote the use of electric vehicles through legislation and administration. For instance, California and New York in USA try to require large automobile manufacturers to sell 20% environmental vehicles without any gas exhausted in their total sales in 1999. Only electric vehicles can meet such standard on the basis of the present scientific and technical development level. However the sales share of such product only accounts for 2% or less in the automobile market in 2000, which could not result in an economic and large scale in manufacturing. Therefore, many designs remain at the stage of sample products, such as EV-1 and S-10 manufactured by General Motors Corporation, e-com manufactured by Toyota Motor Corporation, EV-plus manufactured by Honda Motor Corporation, "glowworm" manufactured by National Institute for Environmental Studies in Japan and other electric vehicles manufactured by the famous auto factories in the world, such as Ford, Citroen, Nissan, Daihatsu, etc. Continuous run under one charge is a main performance index for above products. TEVAN, made by Chrysler, with 810 Kg nickel-cadmium battery can run 130 km under one charge, and EV-1 can only run 120 to 140 km under one charge. A KAZ car newly developed in Japan can run 300 km under one charge.

Thus, what are the main reasons impacting an increase in population of electric vehicles?

First, the mileage run under one charge is not long enough, since the energy of all kinds of present batteries are too low to reach a long run under one charge.

Second, the charging time is too long. At present, a fast charging will reduce capacity and service life of a battery no matter what kind of battery it is. Moreover, it will still take several hours for a fast charge. Furthermore, the cost will be greatly increased if charging during peak period of power consumption. Thus the efficiency for using electric vehicles will be decreased.

Third, most research institutions always pay attention to the research and development of new powerful batteries, such as nickel-hydrogen battery, lithium ion battery, sodium sulphur battery, lithium sulphur battery, lithium iron, lithium polymer battery, etc. On the other hand, consumers could not bear high cost of such batteries due to research cost and less demand.

The electric vehicles mentioned above could daily run an average of about 100 km per charge, resulting in low efficiency of service. Therefore, it is predicted that electric vehicles could be popularized and applied on a large scale only after batteries with energy ratio more than 200 and low cost are developed and short charging time is achieved.

At present, in large cities public communication systems are promoted. To reduce road-to-population ratio is a common aim for all governments in large cities. More measures are provided, such as setting up special lanes for public communication vehicles. Among present public communication vehicles, trolley bus and electric driven vehicles with light railway will cause high pressure to electric power grid if developing in a large amount, and present electric driven vehicles will result in a great pressure on city finance due to high costs. The cities with less financial capability are unable to select such public communication systems as subway and light railway, and buses with "internal-combustion engine" in a large amount exist other problems, such as air pollution, tropical island effect, potential fires and explosions.

SUMMARY OF THE INVENTION

In order to solve the problem that electric bus is not popularized and applied on a large scale due to high operation cost and low efficiency, the present invention provides an electric public transit system, comprising:

an electric driven bus equipped with a cassette battery set and a bus-mounted control system;

a charge station placed in a predetermined place for charging cassette battery sets; and a loading and unloading apparatus; wherein when the bus needs change the cassette battery set, the loading and unloading apparatus unloads the cassette battery set from the bus and loads a charged cassette battery set into the bus;

the charge station and the loading and unloading apparatus are equipped with their control systems respectively;

the loading and unloading control system, the bus-mounted control system and the charge control system are able to intercommunicate;

whereby when the loading and unloading control system receives a signal sent from the bus-mounted control system of the bus that the bus will return to the charge station, the loading and unloading apparatus moves to a predetermined position corresponding to the bus at the charge station and waits;

when the bus arrives at the predetermined position, the loading and unloading apparatus operates exchanging cassette battery sets, whereby the bus operates on line continuously.

The bus-mounted control system may include at least one PLC programmable logic controller. After the loading and unloading apparatus completes exchanging cassette battery sets, the bus-mounted control system controls to lock the cassette battery set and complete whole electrical connection within the bus. The bus has a special chassis equipped with a hanger frame for holding the cassette battery set, the hanger frame is equipped with rollers, electrical connection means, and at least two automatic locking means. The rollers are capable of engaging with the cassette battery set. The electrical connection means is for implementing electrical connection with the cassette battery set. A or each locking means includes a motor, a reduction gear, and a screw rod press means driven by the reduction gear. After the cassette battery set is inserted into the hanger frame on the special chassis and positioned, the locking means are automatically controlled by the bus-mounted control system to lock the cassette battery set within the hanger frame so as to ensure security during running of the bus.

In another embodiment of the present invention, the bus has a frame of a truss type structure, and the bus-mounted control system includes at least one PLC programmable logic controller. The truss type structure is formed with a whole skeleton, and a whole integral body is formed. A hanger frame is positioned on a chassis of the frame for containing the cassette battery set. A hanger frame may be equipped with rollers, locking means, positioning means, and joint means for engaging with the loading and unloading apparatus.

The bus may be further equipped with an auxiliary start means. The auxiliary start means includes a capacitor or capacitors and an auxiliary motor, high power ratio charging and discharging characteristic of the capacitor is utilized for storing energy produced during electric braking for the use by the auxiliary motor. The bus-mounted control system determines whether a current speed of the bus is zero or not. If the speed is accelerating from zero, the auxiliary motor is started to aid a main motor of the bus for starting the bus with a reduced starting current.

The bus may be further equipped with a two-grade braking means. When a driver steps on a brake pedal lightly, a main motor of the bus is changed to a generator for changing inertia kinetic energy of the bus into electrical energy, which is charged into a capacitor for storing by a charging controller in an electric braking system. When the driver steps on the brake pedal deeper, a pneumatic brake system is started to stop the bus. The pneumatic brake system includes a motor, an air pump and a gas container.

The cassette battery set may include a housing for containing battery units, sockets placed on the housing, and a plurality of battery units connected by wires within the housing. The cassette battery set may include groups of battery units. Groups of battery units may be spaced by partitions. Each group of battery units may comprise a plurality of battery units. The battery units and groups of battery units are electrically connected by wires to rods of the sockets. The housing of the cassette battery set may be further equipped with positioning means, and locking means, for positioning and locking the housing on the bus respectively. The positioning means and locking means may adopt pin-hole connections. Openable covers may be mounted above openings of cavities of the sockets.

The bus may change its cassette battery set when the cassette battery set is discharged at about 60% to 80% of discharge depth.

The bus may, preferably, change its cassette battery set when the cassette battery set is discharged at about 70%, of discharge depth.

The charge station may further include a charger or chargers, a charging shelf or charging shelves for containing cassette battery sets, and a power grid auto-trace apparatus for searching electrical consumption valleys. The chargers may comprise a high-tension charger or high-tension charges, and a low-tension charger or low-tension chargers. The charge control system may be a programmable logic controller. The programmable logic controller, based on voltage data of power grid for each period scanned by the power grid auto-trace apparatus at all period of time, controls the charger(s) to charge cassette battery sets during electrical consumption valleys of power grid and to keep float charging to cassette battery sets for the rest time.

The charging shelf may be further equipped with a sampling means, a capacity displayer for showing capacity of a cassette battery set, and a temperature measure and control means. The temperature measure and control means may adjust temperature within the charging shelf based on predetermined battery category and model. The charging shelf may further include a plurality of layers of cavities for containing cassette battery sets being charged. The charging shelf may be further equipped with electrical connection means for electrically connecting with cassette battery sets, guiding wheel means, and joint means for jointing with the loading and unloading apparatus.

The charge station may further comprise a plurality of charging shelves and a plurality of loading and unloading apparatus, which may implement loading/unloading and charging cassette battery sets for a plurality of buses simultaneously.

The electrical connection means may be a crocodile clamp contact means, which may include a camshaft clamp means, for smoothly moving a cassette battery set into or out of a cavity for containing cassette battery set in the bus; when the cassette battery set is positioned and locked by the locking means, the camshaft clamp means operates to implement electrical connection.

The crocodile clamp contact means includes a stator or stators, an actor or actors and a support shaft or support shafts made of conductive metal material, a camshaft made of insulating material, and a driving motor. After the cassette battery set is inserted into the cavity for cassette battery set in the bus and accurately positioned, the bus-mounted control system sends a signal to control the camshaft driven by the driving motor to make the stator(s) and the actor(s) of the crocodile clamp contact means tightly clamp rod(s) of the sockets. When the cassette battery set needs change, the bus-mounted control system sends instruction to relax the crocodile clamp contact means, and then the actor(s) is/are open for implementing no resistant plug-in and out of a high-tension contact section and ensuring smoothly inserting into or pulling out the cassette battery set.

The crocodile clamp contact means include a high-tension contact section and a low-tension contact section. The high-tension contact section is, after connected, for providing a high-tension power to a main motor of the bus, and the low-tension contact section is, after connected, for providing a low-tension power to other electric appliances needing low-tension power in the bus.

The loading and unloading control system may include at least one PLC programmable logic controller for controlling the loading and unloading apparatus to perform loading and unloading of cassette battery sets. The loading and unloading apparatus may be of a mechanical arm structure, including a moving platform, a tray for cassette battery set, a lift means, moving tracks of the moving platform, and track wheels. The lift means can lift the tray in a direction vertical to a top plane of the moving platform, and the track wheels may be mounted on the bottom of the moving platform.

The mechanical arms may further include a rotating platform, a rotating mechanism and a driving means for driving the rotating platform. The rotating platform may be placed on the moving platform, and can rotate to 90 degree or 180 degree on the moving platform so as to insert a charged cassette battery set into the bus, and/or take a used or broken cassette battery set out of the bus and deliver to a charging shelf or repair platform in the charge station.

The lift means may further include a lifting system comprising two sets of lifting arms and driving means. The mechanical arms and the charging shelves both may be placed under ground of the charge station. While the bus is returning to the charge station, one set of the lifting arms may take out a charged cassette battery set corresponding to the bus in advance, and moves to a predetermined position corresponding to the bus and waits. When the bus stops at the predetermined position, the other set of the lifting arms may take the used cassette battery set from the bus and moves down to a layer of cavities of the charging shelf corresponding to the used cassette battery set, and the one set of the lifting arms with the charged cassette battery set in arms moves close to the cavity for cassette battery set in the bus and push the charged cassette battery set in. When the housing of the cassette battery set is locked, joint arms are withdrawn. And the other set of the lifting arms with the used cassette battery set puts the used cassette battery set into the corresponding layer.

The mechanical arms may further include sensors for detecting positions of the bus and the charged cassette battery set to be taken on the charging shelf. Sensors are placed on different positions on the mechanical arms in a lifting vertical direction and the charging shelf correspondingly, in order to position freely the tray to any layer of the charging shelf in the vertical direction.

The electric public transit system may further include a control center. The control center may comprise a PC and/or at least one PLC programmable logic controller. The control center may be placed in the charge station and can intercommunicate with the charge control system.

Preferably, the charge control system and the control center may share same programmable logic controller.

The electric public transit system may further include a dispatch and rescue service system. The dispatch and rescue service system may have at least one rescue service vehicle. The rescue service vehicle may be equipped with a battery carrier and a battery passage. The battery carrier may have one or more spare charged cassette battery sets. The battery passage has a cavity for cassette battery set, joint arms and driving means. The battery passage is used for taking a broken cassette battery set from the bus and inserting a spare cassette battery set into the bus. The joint arms and the driving means are used for jointing the battery passage with a joint position for the cassette battery set on the chassis of the bus.

The electric public transit system may further include a urgent loading and unloading apparatus, which may include a scissor lifting mechanism, a hydraulic driving means, a tray for cassette battery set, main wheels driven by a power means, auxiliary wheels steered by manual, and a handle. The tray may be further equipped with a joint means and a moving means. The moving means is a fork driven by a chain, which can move the cassette battery set from the bus to the tray, or deliver the cassette battery set from the tray into the cavity for cassette battery set in the bus.

The present invention further provides a method for operating an electric public transit system, comprising:
an electric driven bus equipped with a cassette battery set and a bus-mounted control system,
a charge station placed in a predetermined place for charging cassette battery sets, and
a loading and unloading apparatus,
when the bus needs change the cassette battery set, the loading and unloading apparatus takes the cassette battery set out of the bus and inserts a charged cassette battery set into the bus,
the charge station is equipped with a charge control system, the loading and unloading apparatus is equipped with a loading and unloading control system, and the loading and unloading control system, the bus-mounted control system and the charge control system are able to intercommunicate;
when the loading and unloading control system receives a signal that a bus of an identification number will return to the charge station, the loading and unloading apparatus moves in advance to a predetermined position corresponding to the bus at the charge station and waits;
when the bus arrives at the predetermined position, the loading and unloading apparatus operates to exchange cassette battery sets, thereby implementing continuous operation of the bus on line.

As detecting that a battery unit or a group of battery units is unable to work, the bus-mounted control system sends a warning signal to the driver of the bus. If the capacity of the rest battery units is able to support the bus to return the charge station, the bus is allowed to return to the charger station. Otherwise, a rescue signal is sent out. After receiving the returning signal from the bus, the charger station sends instruction to wait for exchanging the failed cassette battery set. The loading and unloading apparatus moves to the front of the charging shelf having a charged cassette battery set to be taken and waits for the bus. A repair procedure in the repair system for cassette battery set is started, and the failed cassette battery set taken by the loading and unloading apparatus is delivered to the repair stage at the charger station for testing and repairing.

The present invention further provides a method for charging a cassette battery set used in the electric transit system, which comprises the steps of:
turning on the power of a charger;
reading data of the cassette battery set by a charge control system;
determining whether a power grid used is in valleys by a power grid auto-trace apparatus,
if yes, starting a full charge program in the charger controlled by a charge control system, and charging the cassette battery set with full current until the cassette battery set is fully charged,
if no, starting a float charge program in the charger controlled by the charge control system, and charging the cassette battery set with float current;
charging the cassette battery set with float current when the cassette battery set is determined having been fully charged by the charge control system, whereby the cassette battery set is being charged at least with float current all time except being used in the bus;
reading charging data of the cassette battery set and sending to the charge control system.

The loading and unloading apparatus in the present invention can load and unload the cassette battery set into and from the bus or the charging shelf quickly and accurately. The use efficiency of the bus is highly increased.

The crocodile clamp contact means of the present invention can be used as electrical connection means for cassette battery set in the bus and charging shelves, which can ensure effectively current capacity when contacting with a high-tension section, no resistant plug-in and out, and smooth movement of the cassette battery set into or out.

According to the present invention, the cassette battery sets are charged on the charging shelves out of the buses. This charging process can utilize energy valleys of a power grid. When the power grid is in the peaks in daytime, the cassette battery sets are charged with a small float current. When the power grid is in the valleys during nighttime, such as 12:00 pm to 8 am, the cassette battery sets are charged with large current. In such way, electric driven buses are provided with energy for next day, and power factor Q of power grid in a city is highly enhanced. The power grid can be utilized efficiently and its usage quality is enhanced. Thus, energy structure in the world may be optimized, and effects caused by exhaust gases and heat islands may be reduced.

The electric public transit system of the present invention is a comprehensive solution to public transportation in cities provided after researching and analyzing current problems. It is desirable that the present invention can popularize in large area in cities and substitute current buses, trolley-buses and other vehicles with "internal-combustion engine" in a short term. According to the present number of buses in China, 50% of which will be up to 500,000 in 2010. Annual demand or annual production will reach 100,000 per year. The international market is similar. If calculating on the basis of 100 billion kW·h power of consumed valley in China power system in 1998, the number of the electric buses of the present invention could be up to 700,000 to 900,000 (400 kW·h times 365 is about 150000 kW·h; 150,000 kW·h times 700,000 is about 100 billion kW·h). If calculating in another way, the current number of buses in Beijing is about 15,000, so every thousand people have 1.5 buses. In similar way, a city with 400 million populations will need 600,000 buses. Therefore if the buses of the present invention are used in public transportation system all over the country, 100 billion kW·h power of consumed valley of the power grid would be fully utilized. Thus, the government will have 50 billion Yuan of fiscal revenue every year for electric power. If such revenue directly goes to public transportation enterprises, this "zero pollution" bus project may become "zero cost" public transportation system. As GDP steadily enhances in China, more electrical generation projects are developed, such as hydropower projects at Three Gorge, in upstream of Yangtze River and in Yellow River, and nuclear power technology becomes more mature, it is predicted that total electrical power will be up to 3150 billion kW·h in 2020. Therefore, the power in consumption valleys will be over 300 billion kW·h. At that time, the electric transit buses of the present invention will substitute fuel buses and be applied in a large scale. Electrical energy will replace petroleum and become main power in common transportation activities.

BRIEF DESCRIPTION OF THE DRAWINGS

FIG. 2A is a front view of a special chassis in the electric bus;

FIG. 2B is partial enlarged view for rollers of the hanger frame in FIG. 2A;

FIG. 2C is a plan view of the special chassis of the electric bus;

FIG. 4A is a principle diagram of relay group in crocodile clamp contact means for controlling electrical connection;

FIG. 4B is a principle diagram of relay group in crocodile clamp contact means in series for the high-tension electrical connection;

FIG. 4C is a principle diagram of relays group in crocodile clamp contact means for cutting off broken group of battery units;

FIG. 19A is a front view of a charger shelf;

FIG. 19B is a side elevation view of the charger shelf;

PREFERRED EMBODIMENT OF THE INVENTION

Figure 1:
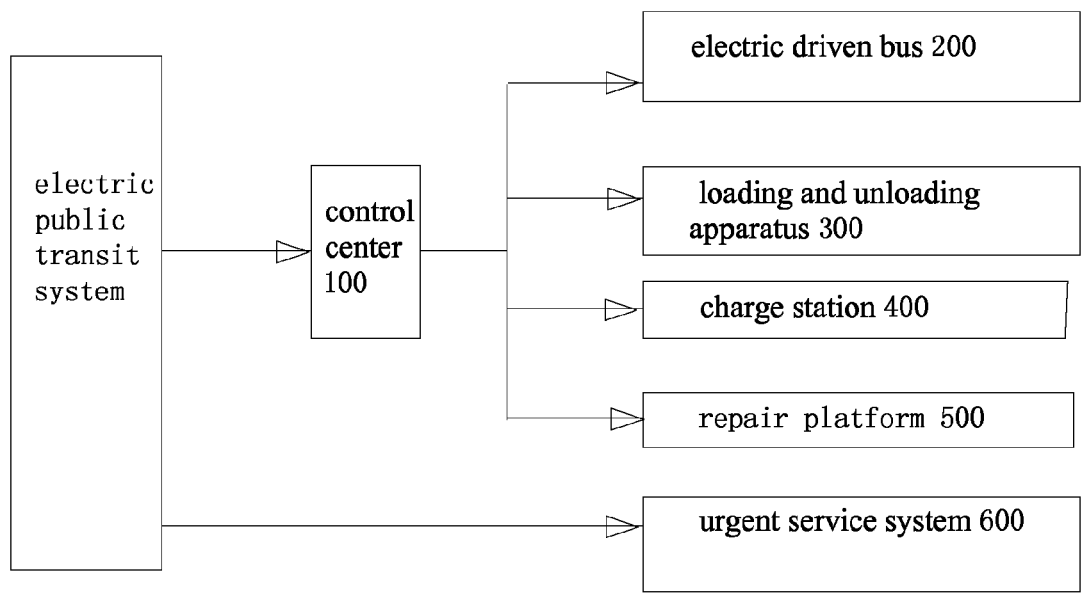
FIG. 1 is a block diagram of an electric public transit system.

FIG. 1 shows an electric public transit system of the present invention. The electric public transit system includes control center 100, electric driven bus 200, loading and unloading apparatus 300 and charge station 400. In addition, the public transit system of the present invention may also further include urgent service system 600 and repair platform 500. The above-mentioned components may intercommunicate with one another by Can bus and/or wireless signal, which implements a quick exchange of cassette battery sets in the bus and economical and intelligent management for charging cassette battery sets, and, therefore, improves the utilization efficiency of electric driven buses greatly while saving energy and protecting environment.

Just as mentioned in technical solutions in the summary of the present invention, the communication protocol in the electric public transit system has two options: (1) realizing the communication directly through a bus-mounted control system, a loading and unloading control system, a charge control system; (2) realizing indirect communication with a bus-mounted control system, a loading and unloading control system and a charge control system through a systematic control center. Preferably, the control center in the electric public transit system of the present invention is set up at the charge station, and realizes a bi-directional communication with the charge control system through a Can bus. More preferably, a programmable logic controller in the charge control system may also act as the control center simultaneously. Therefore, the control center of present invention may be set up alone, or tied with the charge control system, realizing multi-purpose in one computer control system.

Components of the electric public transit system of the present invention will be further described below in the second option as one embodiment, in four portions: (1) an electric driven bus, (2) a loading and unloading apparatus for cassette battery sets, (3) a charge station, and (4) a control system of the electric public transit system and communication protocol.

1. An Electric Driven Bus

In electric driven bus 200 of the present invention, a bus-mounted control system includes at least one programmable logic controller, which is placed in a proper position and controls mechanical parts and electronic means by a Can bus. The bus-mounted control system may send information on bus operation and possible troubles to a receiver of control center 100 by wireless digital impulse techniques. All operation information will be simultaneously shown on the instrument panel of the bus for driver's reference. As shown in FIGS. 2A, 2B and 2C, special chassis 201 is a main part on electric driven bus 200, on which hanger frame 203 is equipped for a cassette battery set. A cavity 220 for cassette battery set is equipped on the hanger frame. Electrical connection means on the hanger frame implements electrical connection with the cassette battery set 204 within the hanger frame. The hanger frame 203 is further equipped with rollers 202 capable of engaging with tracks 206 for cassette battery set 204. The hanger frame 203 is equipped with joint openings 207 for engaging with the loading and unloading apparatus to make the cassette battery set smoothly and accurately insert into the hanger frame 203 in electric driven bus. This rollers are arranged densely for bearing at least 0.5 to 2 tons weight of the cassette battery set 204 and various momentum of the electric driven bus in motion state. In such way, accurate direction of cassette battery set 204 being inserted into the hanger frame is ensured and accurate jointing of electrical connection parts is guaranteed. Hanger frame 203 may be also equipped with at least two automatic locking means 205. The locking means lock the cassette battery set by a screw rod press means driven by a motor and a reduction gear. Preferably, four locking means 205 are used to lock four corners of the cassette battery set automatically in this embodiment of the present invention. Movements of locking means are controlled to lock or unlock automatically by the commands sent out by the programmable logic controller of the bus-mounted control system. When the cassette battery set is inserted into the cavity 220 and positioned in a right position, positioning sensor/sensors 256 will send out signals, the programmable logic controller of the bus-mounted control system sends a command to four locking means 205 to lock the cassette battery set 204 firmly in the hanger frame automatically, so as to ensure security during running of the bus. Certainly, other types of locking structures, or a plurality of locking means, or locking other parts of the cassette battery set may be used, which may be carried out by the person skilled in the art without his/her creative labor.

Figure 3A:
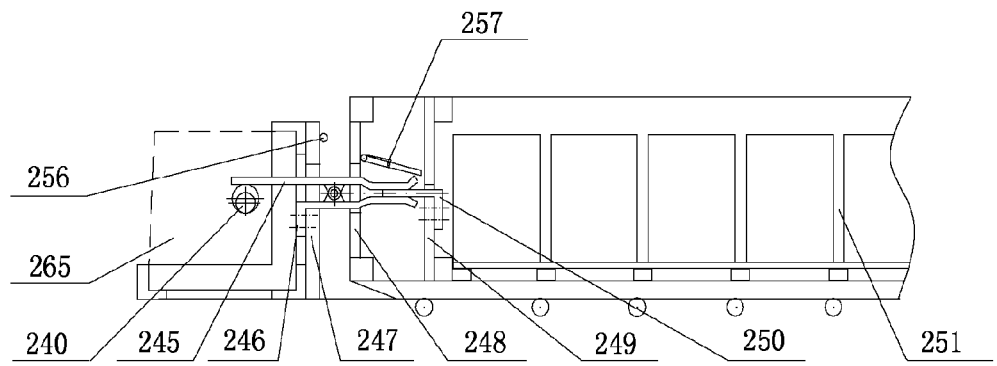
FIG. 3A is a front view of a crocodile clamp contact means.
Figure 3B:
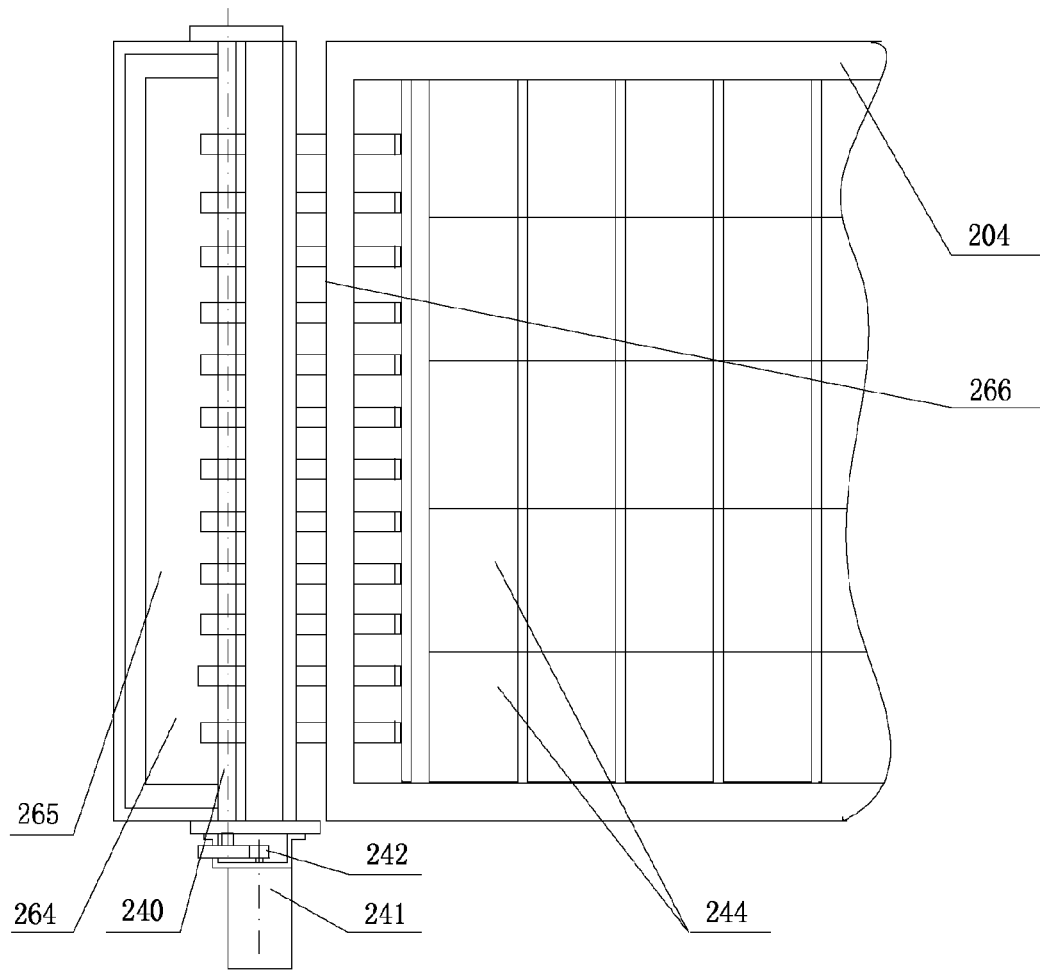
FIG. 3B is a plan view of the crocodile clamp contact means.

As shown in FIGS. 3A and 3B, the electrical connection means set on hanger frame 203 is crocodile clamp contact means, which can implement no resistant plug-in and out and high effective electrical connection. Simultaneously the same crocodile clamp contact means may also be mounted on the charging shelves for containing cassette battery set at charge station. This crocodile clamp contact means includes stators 246, actors 245 and support shafts 248 made of conductive metal material; a camshaft 240 with cams made of insulating material; a driving motor 241, and a gear reduction 242. The stators 246 are fixed on hanger frame 203, and pivots are equipped between stators 246 and actors 245. The corresponding ends opposite to the engaging ends of stators 246 and actors 245 can be supported by camshaft 240. After the cassette battery set 204 is inserted into the cavity 220 in the bus and positioned in the right place, the bus-mounted control system sends a signal and controls motor 241 to drive camshaft 240 to make the stators 246 and actors 245 engaging with rods 250 tightly for ensuring effective current capacity in contacting high-tension sections. When the cassette battery set needs exchange, the bus-mounted control system will send out a command to relax camshaft 240 to loosen the actors 245, which can guarantee no resistant plug-in/out of a high-tension section of electric contact means and freely inserting or taking the cassette battery set into or out. Such means ensure that a quick and easy exchange of the cassette battery set and enough capacity of contact current during running of the bus. In addition, the crocodile clamp contact means is separated into a high-tension section 265 and a low-tension section 264, in which relays are included and combined for control in order to maximally shorten electric power connection lines between each group of crocodile clamp contact means and each group of relays.

The cassette battery set supplies power for entire the electric driven bus in the electric public transit system of the present invention. The cassette battery set contains a high-tension section consisting of several dozens of battery units 244 connected in series as a plurality of groups of battery units respectively, for providing a high-tension power; and a low-tension section consisting of at least one battery unit 244 for providing a low-tension power. Thus several dozens of battery units within entire cassette battery set 204 are divided into a plurality of groups of battery units. 246 and 250 are rods of sockets for connecting by wires. 251 are thermal insulating layers between battery units. 247, 248 and 249 are rod brackets, made of insulating material. Camshaft 240 is also made of insulating material. Such structure can ensure that no high-tension electricity existing in entire cassette battery set during exchanging the cassette battery set. High-tension power is formed only by connecting all groups of battery units in series through a combination of crocodile clamp contact means and relays after the cassette battery set is inserted and positioned within the cavity 220 in the bus. The crocodile clamp contact means comprises a series of crocodile clamp contact parts. Covers 257 are placed above the openings of the cavities of the sockets 266 of the cassette battery set, and are able to close automatically when the crocodile clamp contact means is pulled out. When the crocodile clamp contact means is detached from the cassette battery set, covers 257 close automatically to avoid any danger caused by accidental touch with rods of sockets in the high-tension section and ensure safety in use of the cassette battery set. The low-tension power is provided to the electric driven bus through battery unit 244 and rod 250 of the socket in the low-tension section.

As shown in FIGS. 4A, 4B and 4C, the arrangement and function of groups of relays in crocodile clamp contact means are illustrated. Before the crocodile clamp contact means contacts the cassette battery set, the bus-mounted control system will control to cut the electricity connection between the cassette battery set and the electric driven bus by the arc relay J0. Camshaft 240 is driven to rotate by motor D2 through relays J8 and J9, to realize clamping and relaxation of the crocodile clamp contact means. The locking means 205 on the hanger frame are controlled by motor D1 through relays J6 and J7, to realize the locking of the cassette battery set within cavity 220. The high-tension power of the cassette battery set is formed by closing relays J1 to J5 in series in groups of battery units. If the bus-mounted control system detects that one group of battery units fail to work in the cassette battery set while running the bus, the bus-mounted control system could control to the relays for this failed group of battery units to open/close, and thus cut this group from the connection of entire groups of battery units in series, and, therefore, the high-tension power provided by the rest groups of battery units in the cassette battery set remains to drive the electric driven bus.

Figure 5:
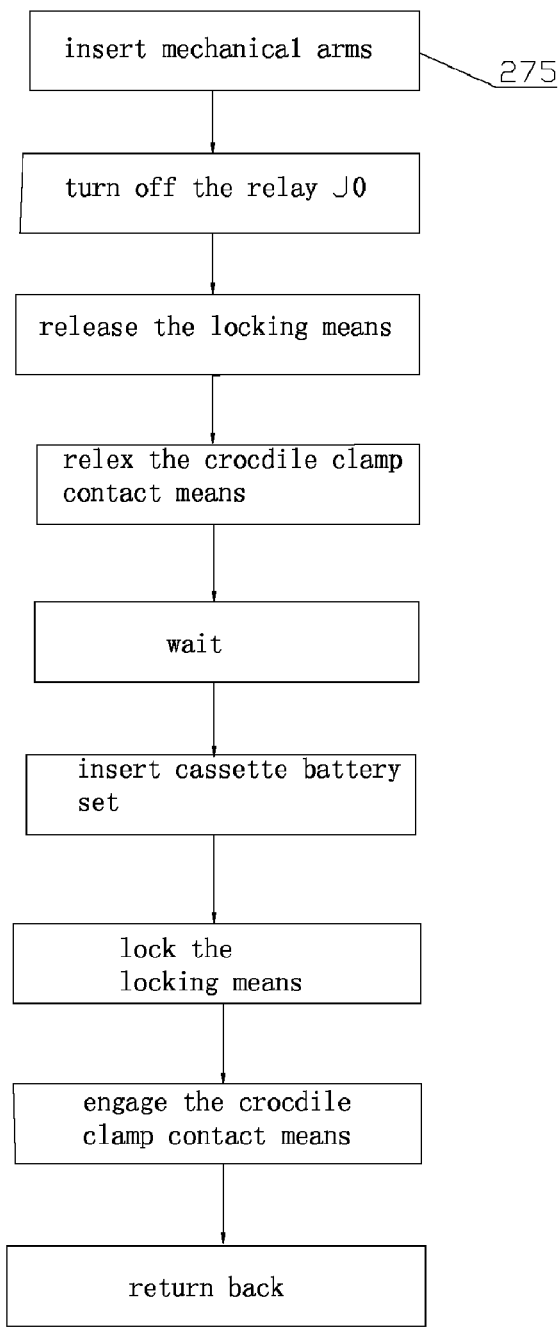
FIG. 5 is a block diagram of a procedure for exchanging the cassette battery set on the hanger frame.

As shown in FIG. 5, the block diagram is the exchanging procedure 275 for cassette battery set. As the joint arms of the mechanical arms insert into joint openings 207 in the hanger frame in the bus, the positioning sensor(s) in openings 207 gets the signal for the coming exchange of the cassette battery. The cassette battery set exchanging procedure 275 will start to run. First, the power is shut off, namely the relay J0 is close/open. Next, the locking means is released, the crocodile clamps are relaxed, and the cassette battery set is waiting to be exchanged. After cassette battery set is inserted into the cavity, the locking means are locked, the crocodile clamp contact means are re-clamped, combination of relays is all connected. Then the relay J0 is connected in front of a high-tension controller, and the necessary power is provided to the electric bus.

Figure 6:
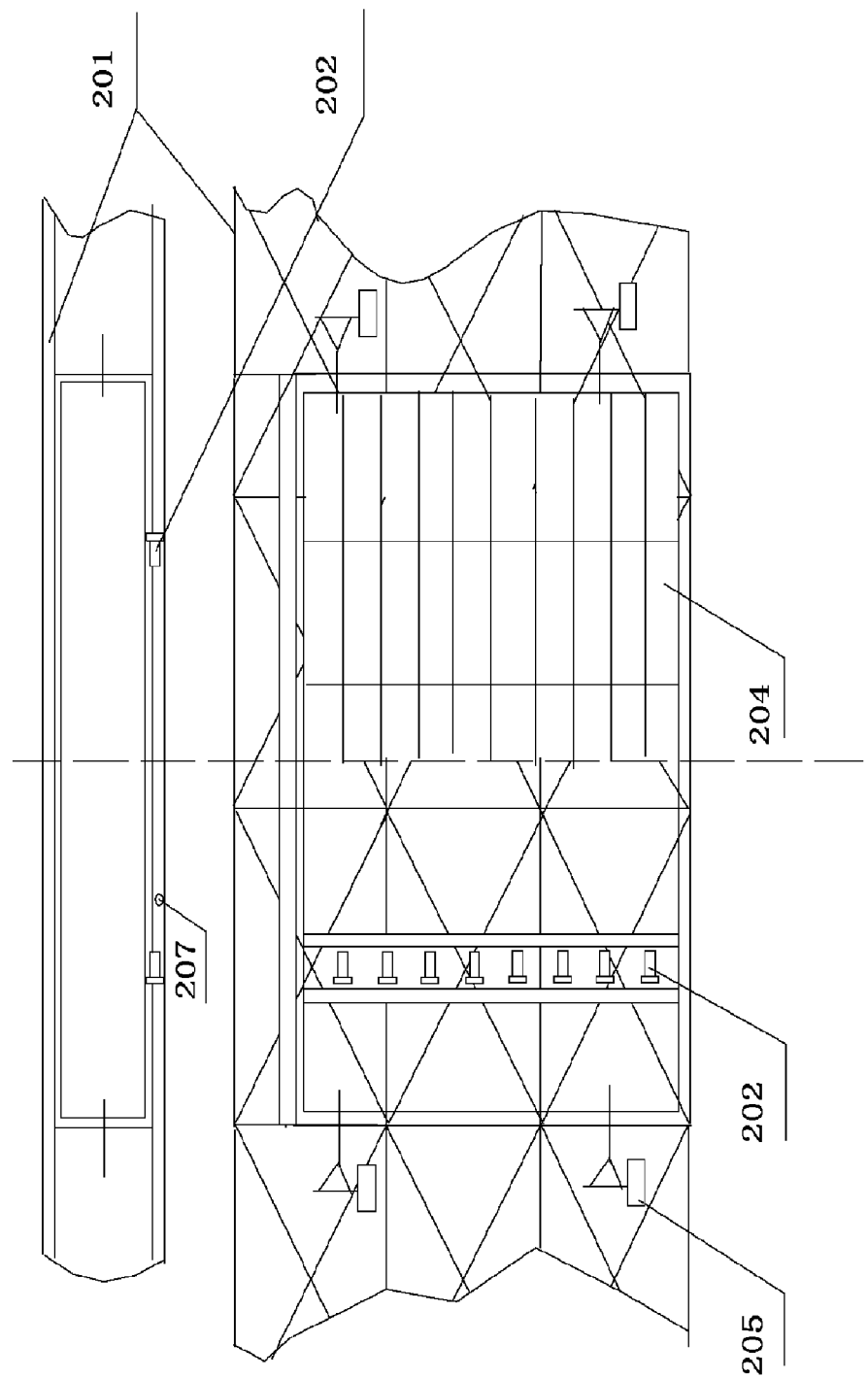
FIG. 6 is a schematic view of integral body of an electric bus.

FIG. 6 shows another embodiment of an electric public transit system according to the present invention. The electric driven bus has a frame of a truss type structure. On the chassis of the frame are mounted same rollers 202, locking means 205, and joint openings 207 for engaging with the loading and unloading apparatus. The truss type structure is formed with a whole skeleton, and a whole integral body is formed with drawing a skin over the skeleton. A finite element analysis method must be used to analyze stress structure over entire body for designing entire structure in order to ensure structure intensity of the entire bus.

Figure 7:
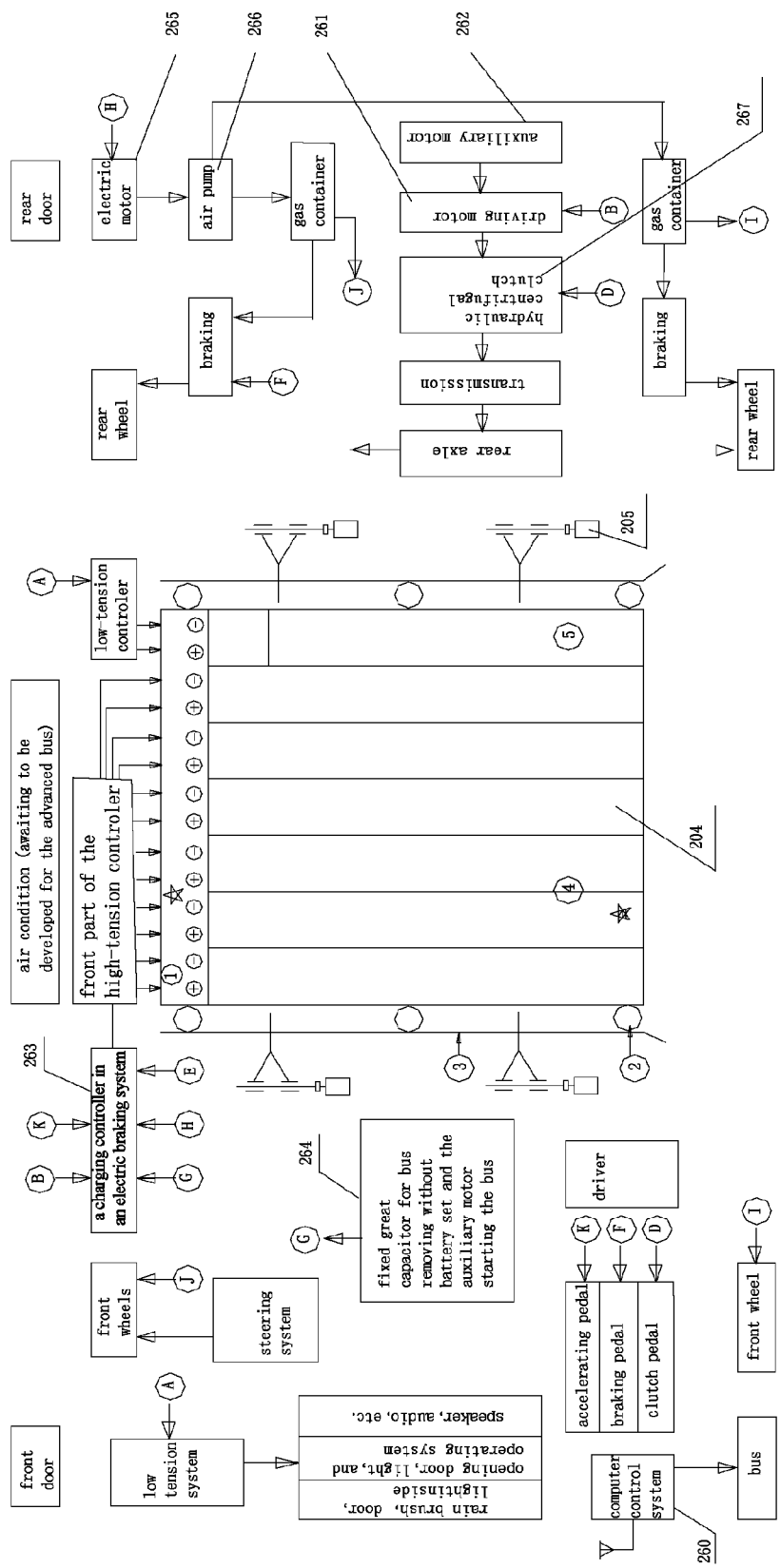
FIG. 7 is an overall schematic view of an electric bus.

As shown in FIG. 7, the electric driven bus 200 also has a fixed great capacitor 264 mounted in the bus, which is controlled by a charging controller 263 in an electric braking system to store energy produced by braking through an electric braking system, through utilizing capacitor's characteristic of charging and discharging in great ratio power, and to supply for the auxiliary motor 262 in the bus 200 to discharge in short term and help main motor 261 to start bus 200. The bus-mounted programmable logic controller 260 determines whether to start the auxiliary motor 262 on the basis of whether the current bus speed is zero or not. Only when the speed of the bus is accelerating from zero, the auxiliary motor 262 will start for several seconds or dozens of seconds to reduce the starting current of the main motor as the electric driven bus starts. The transmission of electric driven bus 200 may be also equipped with hydraulic centrifugal clutch 267 and centrifugal overdrive 2-speed gear to make the starting current smaller and lower the impact on batteries and electric control system by large current. The electric driven bus 200 is equipped with two-grade braking means to improve the brake efficiency of electric driven bus 200. When the driver steps on the brake pedal lightly, the main motor 261 of the electric driven bus will turn into a generator to change vehicle inertia kinetic energy into electric energy which is charged into a bus-mounted capacitor 264 controlled by a charging controller 263 in the electric braking system. When the driver steps on the brake pedal deeply, the pneumatic brake system will start to stop the vehicle promptly. The pneumatic brake system comprises driving motor 265 and air pump 266, and a gas container provides gas resource. The above means has advantage of reducing instant impact current while electric driven bus 200 starts and protecting the cassette battery set 204 for a longer usage. The above means also lengthen the service life of the main motor 261 and a controller of main motor.

Figure 8:
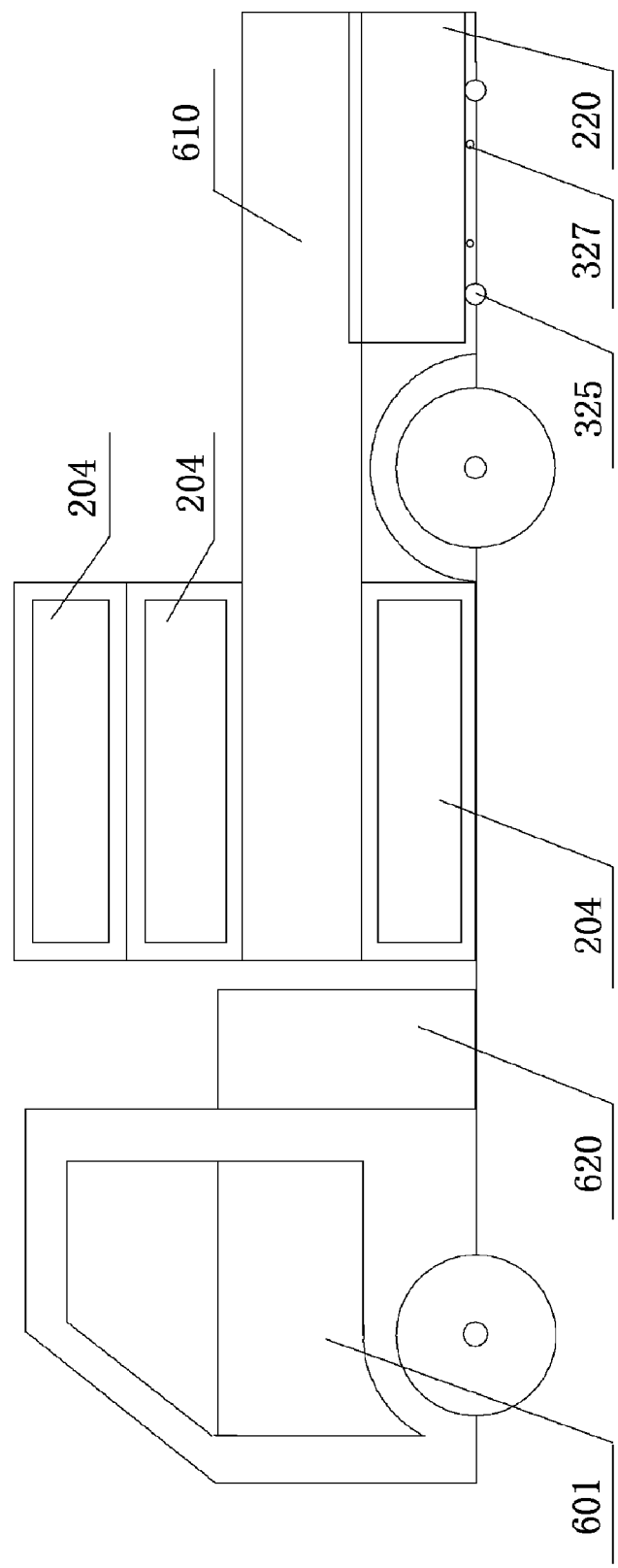
FIG. 8 is a structure schematic view of an urgent service vehicle.

FIG. 8 shows the schematic view of urgent service vehicle 601 equipped in urgent service system 600. The urgent service vehicle 601 is equipped with one spare tyre 620 and capable of exchanging the broken cassette battery set in the trouble electric driven bus on the accident spot. The urgent service vehicle has a bus-mounted battery carrier with a spare cassette battery set 204, a battery passage 610 with a cavity 220, joint arms 325, and driving means 327. Battery passage 610 is used to take the broken cassette battery set from the bus and insert the spare cassette battery set into the hanger frame in the bus. Driving means 327 and joint arms 325 are used to joint battery passage with joint positions for the cassette battery set on the chassis of the electric driven bus.

Figure 9A:
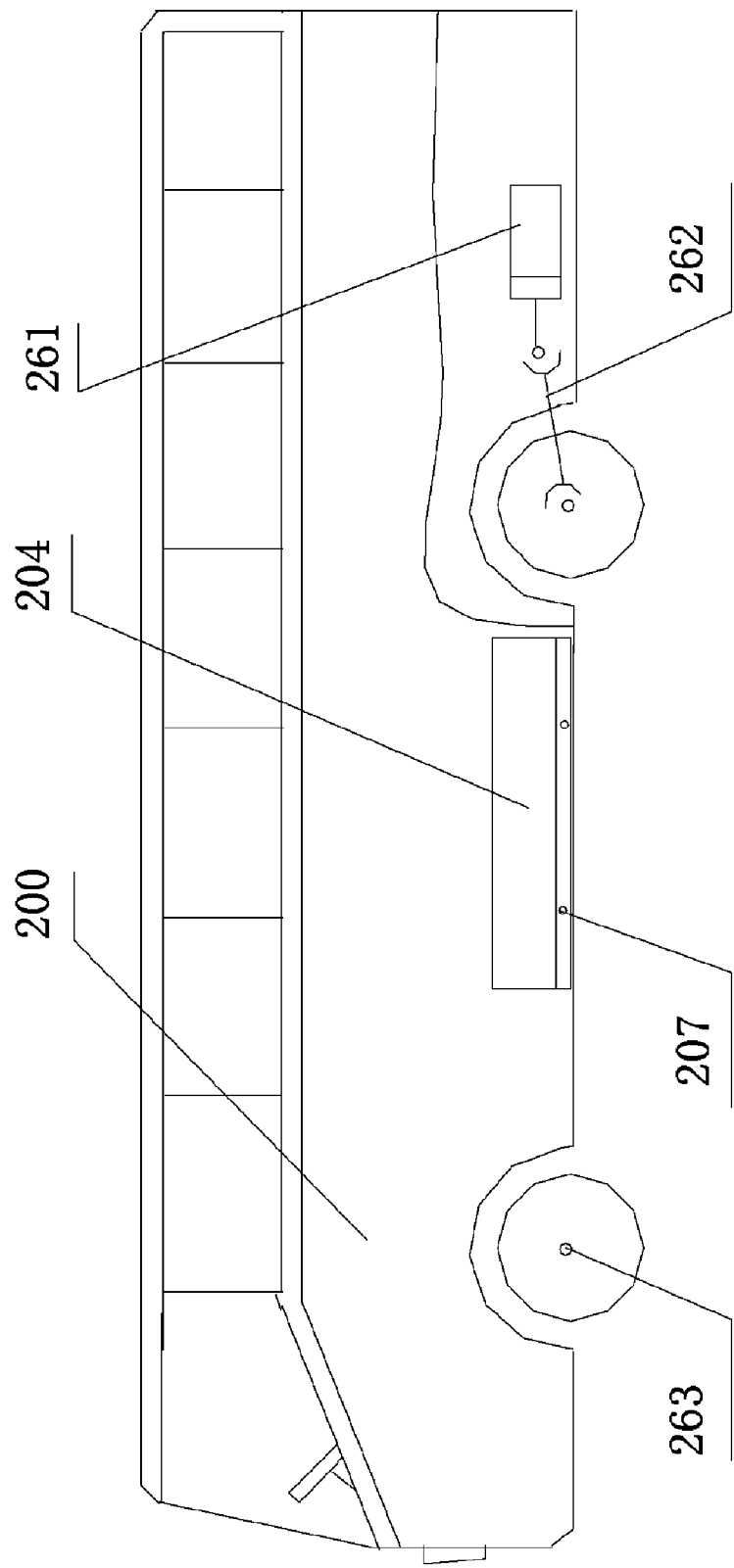
FIG. 9A is a schematic view of a cassette battery set midmounted while driving motor rear-mounted on a chassis of an electric bus.

As shown in FIG. 9A, the electric driven bus 200 may be designed as the following structure: the cassette battery set 204 is mounted in the middle of the chassis, main motor 261 is mounted on the rear of the chassis, and heavy parts, such as electric air pump, gas container, bus-mounted low-tension storage battery, are arranged with the main motor to balance the weight of the cassette battery set.

Figure 9B:
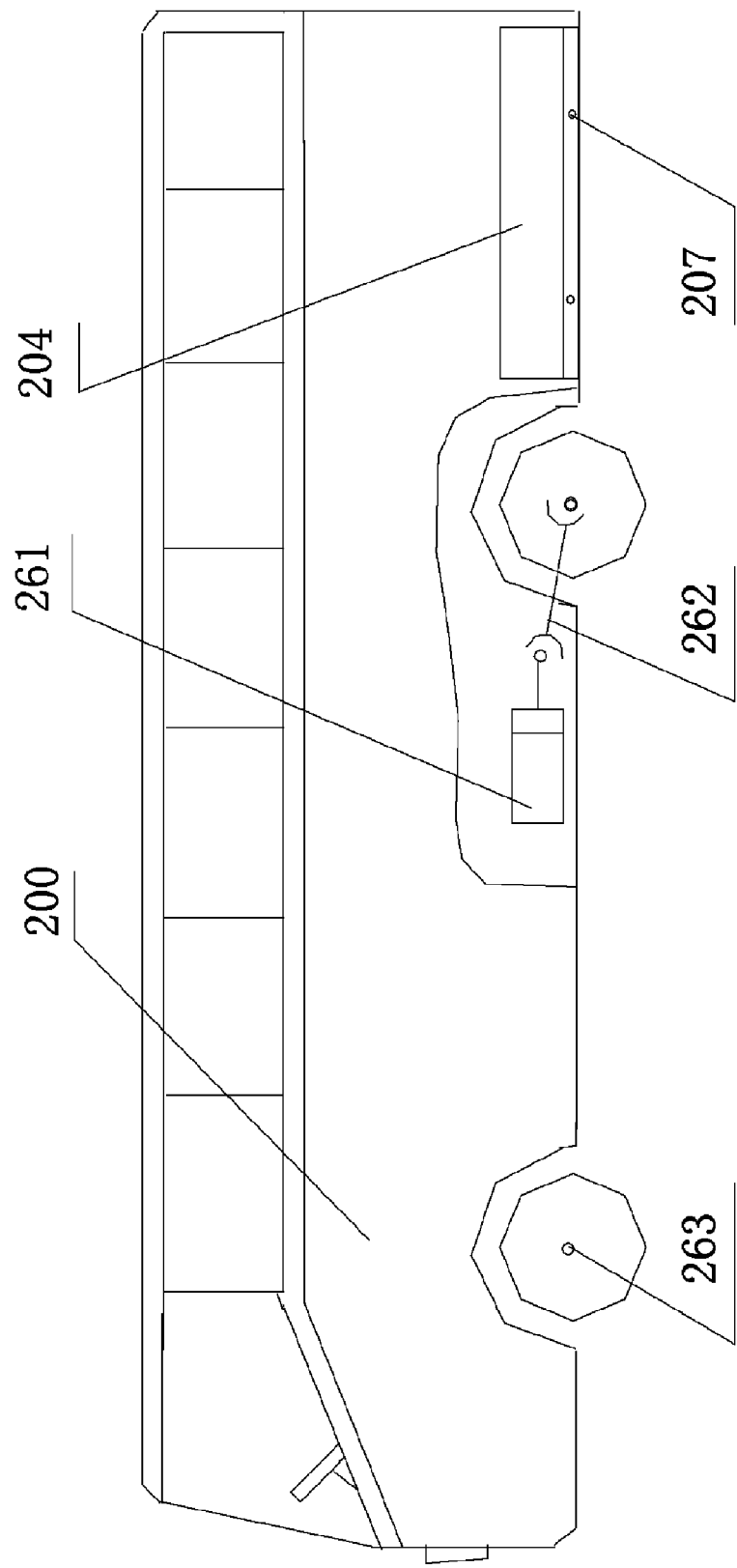
FIG. 9B is a schematic view of a cassette battery set rear-mounted while driving motor mid-mounted on a chassis of an electric bus.

As shown in FIG. 9B, the electric driven bus 200 may be designed in such way: the cassette battery set 204 is rear-mounted, and main motor 261 is mid-mounted on the chassis. Such structure is suitable to a reasonable construction of bottom floor with arrangement of entrance at front and rear doors and out door at mid-door.

2. The Loading and Unloading Apparatus for the Cassette Battery Set

Figure 10A:
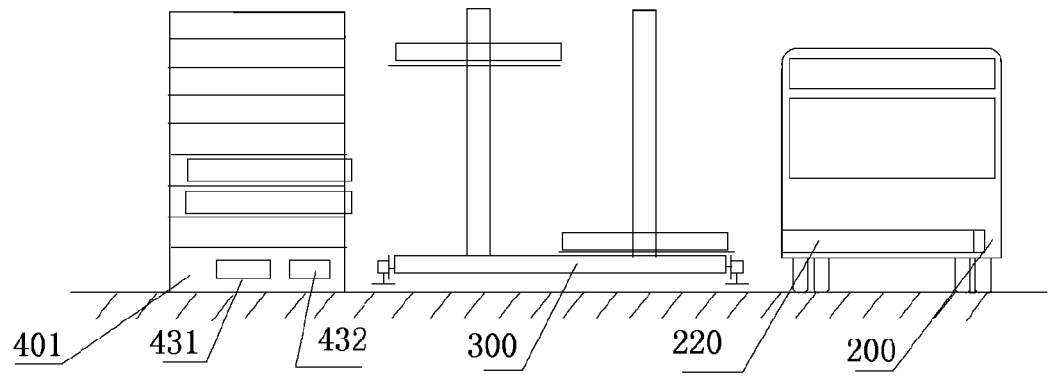
FIG. 10A is a front view of an arrangement of an electric driven bus, mechanical arms of balance type and charge station (a ground type)
Figure 10B:
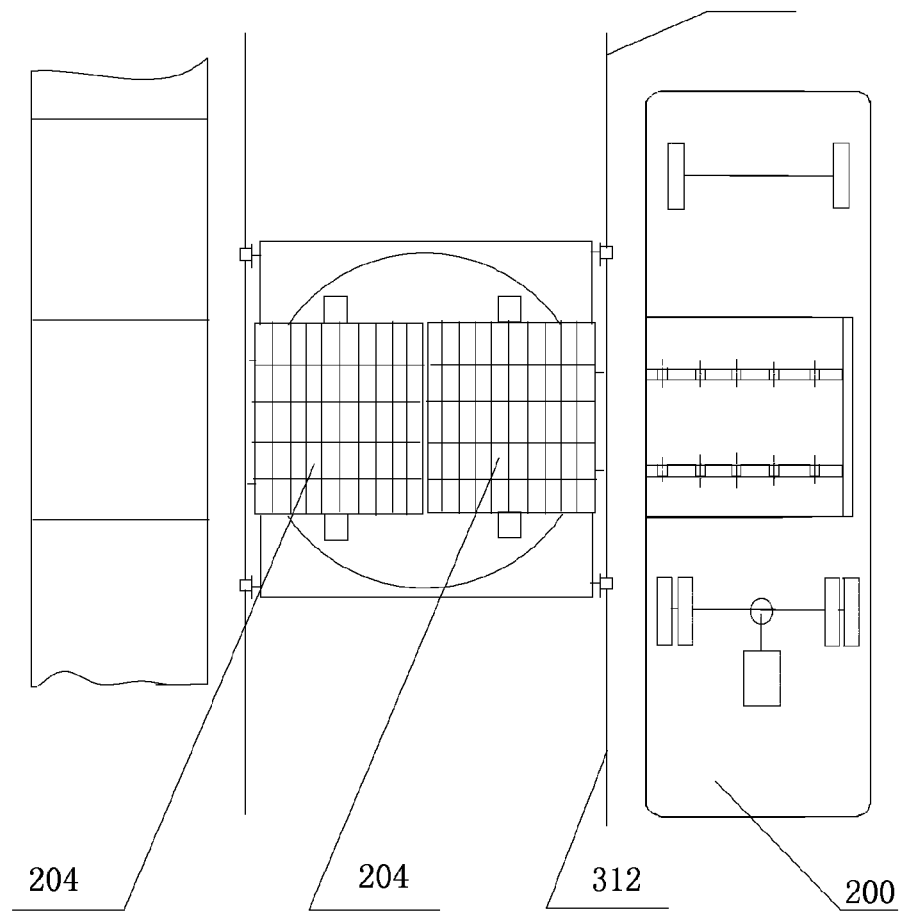
FIG. 10B is a plan view of an arrangement of the electric bus, mechanical arms of balance type and charge station (a ground type)
Figure 11:
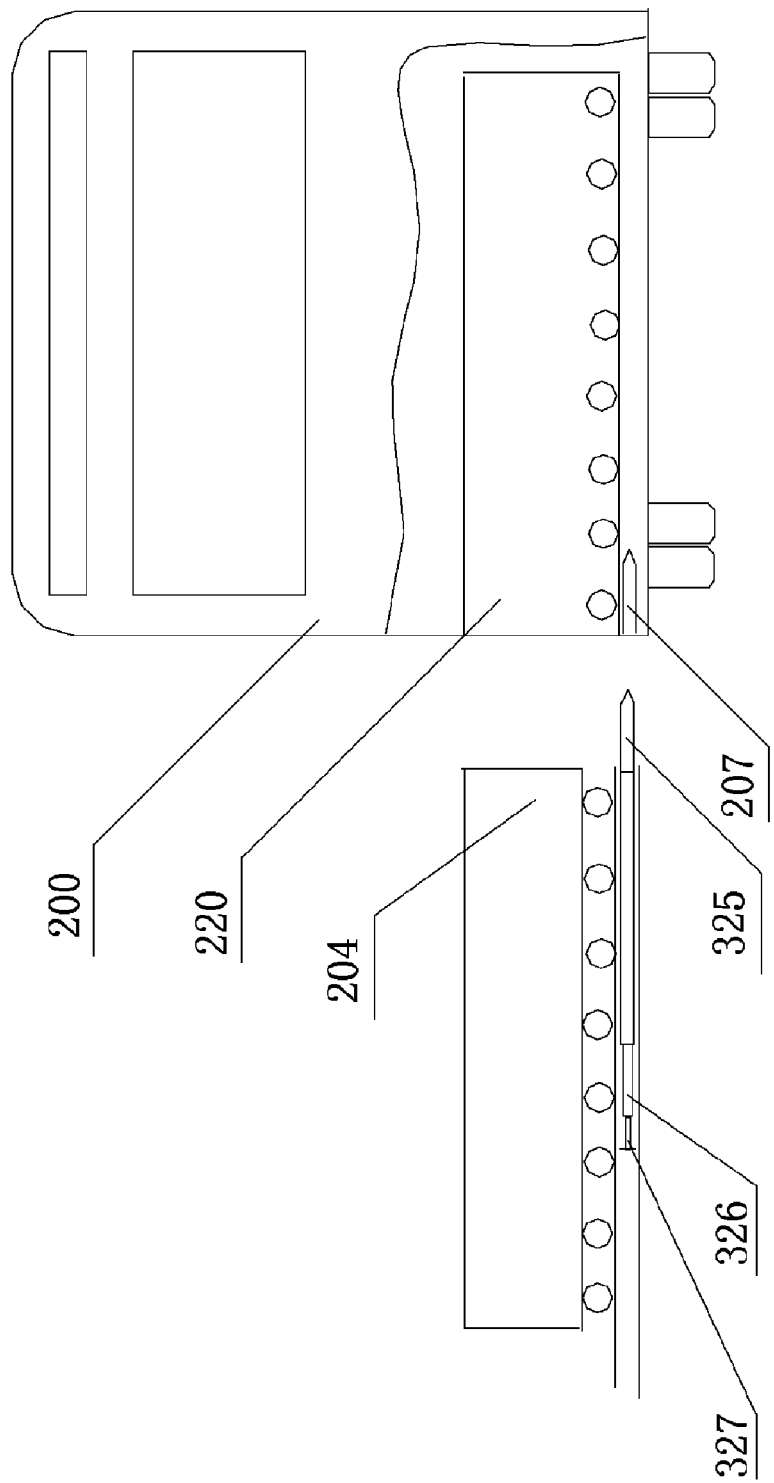
FIG. 11 is a structure schematic view of joint arms of mechanical arms of balance type and joint opening on a chassis of an electric bus.
Figure 12A:
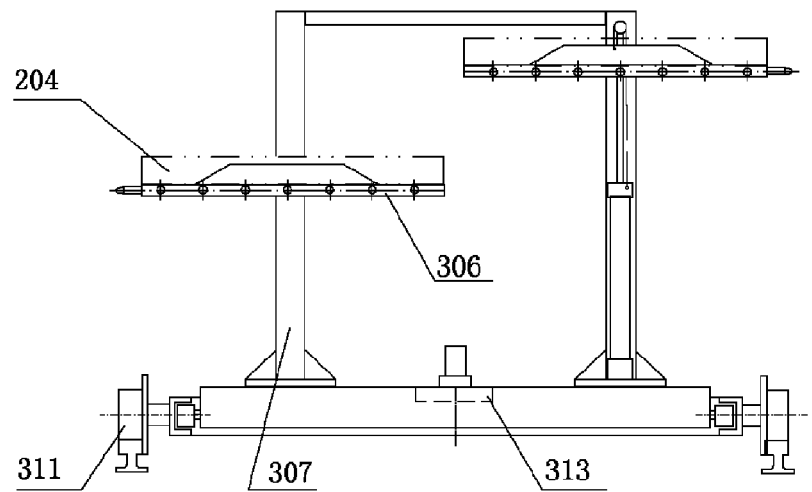
FIG. 12A is a front view of the structure of mechanical arms of balance type.
Figure 12B:
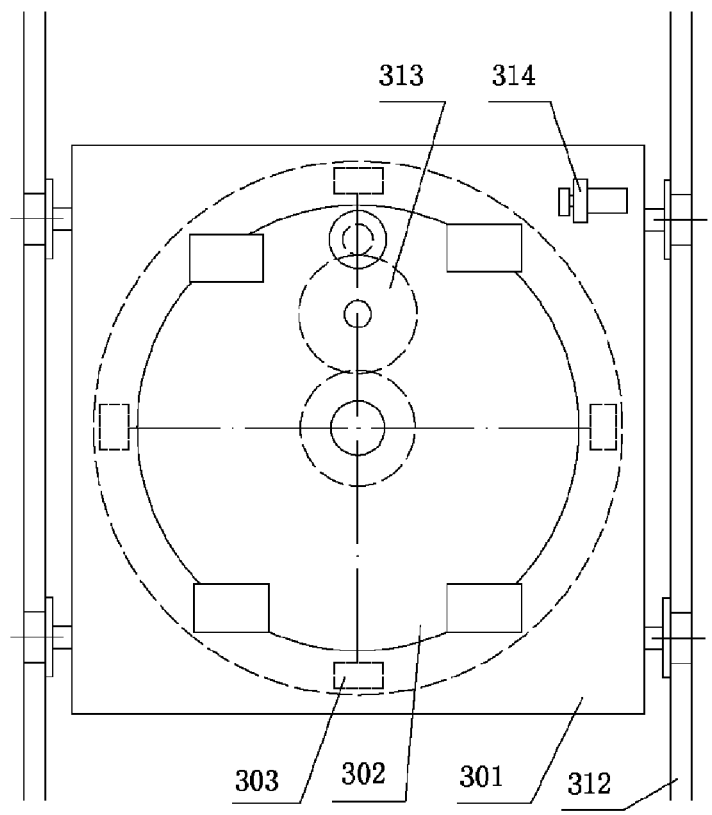
FIG. 12B is the plan view of the structure of mechanical arms of balance type.
Figure 13:
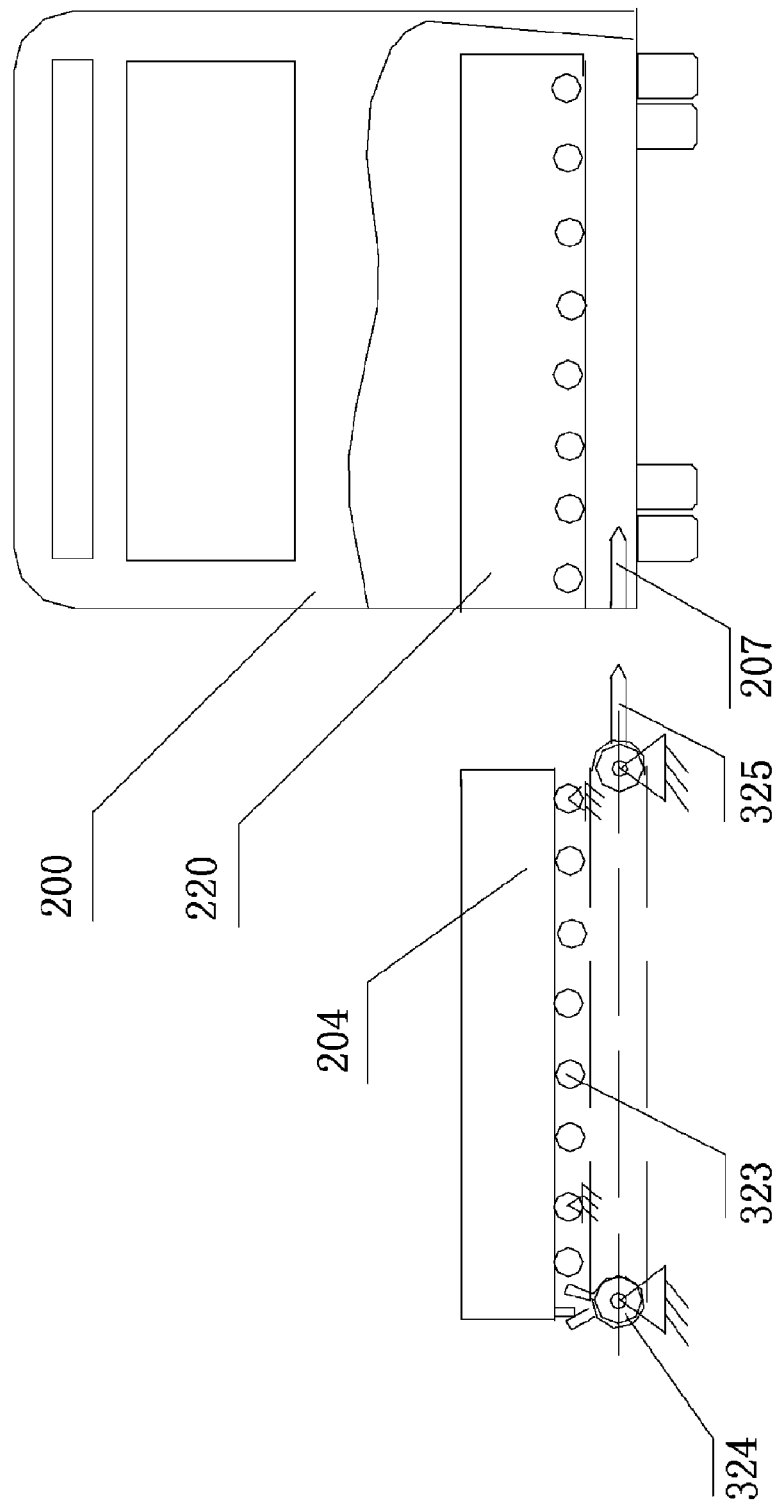
FIG. 13 is a schematic view of the structure of mechanical arms of balance type in a moving means for moving the cassette battery set.

FIGS. 10 to 13 show mechanical arms of balance type in loading and unloading apparatus 300 of ground type in an electric public transit system of the present invention. FIG. 10 shows arrangement of the electric driven bus, charge station, and mechanical arms of balance type (ground type). FIG. 11 is the structure schematic view of the joint arms of mechanical arms of balance type and joint openings on the chassis of the electric driven bus. FIG. 12 is the structure of mechanical arms of balance type. FIG. 13 is the schematic view of mechanical arms of the balance type with the moving means for the cassette battery set. The mechanical arms of balance type include moving platform 301, rotating platform 302, vertical lift means 307, tray 306, tracks 312, track wheels 311 and rotating mechanism 313. Rotating platform 302 is driven by a motor and gear reduction 314 under the command of a programmable logic controller positioned in a proper place on the mechanical arms, and supported on the moving platform 301 by rollers 303. The vertical lift means 307 comprises vertical lift hydraulic cylinder 331, a chain 332, and a gear 335, and a plurality of sufficient sensors 308 are positioned in the vertical lift arms, which can make tray 306 positioned at any place along the vertical lift arms. Joint arms 325 and the moving means 324 and rollers 323 are set up on the tray 306 for cassette battery set. The moving means 324 comprises shift fork driven by the chain. The movement mechanism of the mechanical arms of balance type moves parallel along track 312 via track wheels 311 driven by a driving means. When entire mechanical arms move along track 312, they are positioned by a plurality of sensors placed at corresponding positions on the track in the front of each group of the charging shelves.

When the bus stopped completely, the joint arms 325 stretch out automatically from the tray of mechanical arms of balance type and engage with the joint opening 207 under the cavity in the electric driven bus in order to avoid the difference in height produced while the cassette battery set having a weight of 0.5 to 2 tons is exchanged on the chassis of the bus. The above action is before moving the cassette battery set. The joint arms first stretch into the joint openings 207 for jointing, so the jointing is very accurate and no errors in positioning. If the electric driven bus 200 and loading and unloading apparatus 300 were not jointed together before moving the cassette battery set 204, the cassette battery set 204 of heavy weight would inevitably quiver up and down and from side to side while moving forward, so that it would be hard to joint the cavity with the electric driven bus 200 accurately.

Joint arms 325 include drive mechanism 326 and its power means, such as a hydraulic cylinder 327, which could guarantee the cassette battery set moving in or out smoothly after the electric driven bus positioned automatically, and compensate the deformation of hang springs in the electric driven bus caused while heavy cassette battery set moves in/out the cavities in the electric driven bus. Thus, the cassette battery set can steadily move between mechanical arms of balance type and the electric driven bus.

Figure 14:
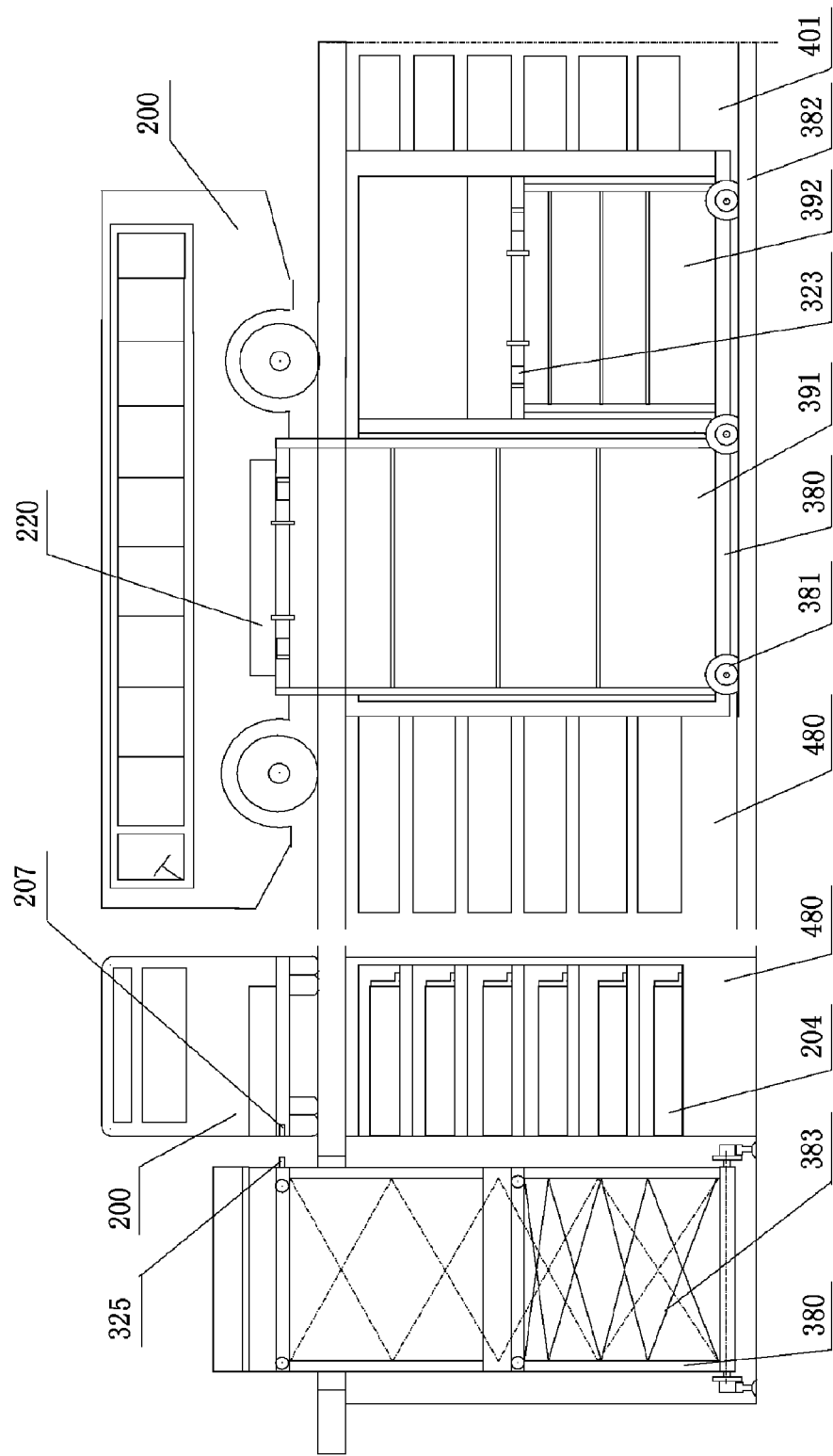
FIG. 14A is a side elevation view of an electric bus and mechanical arms of parallel type (underground type) in a charge station.
FIG. 14B is a front view of the electric bus and mechanical arms of parallel type (underground type) in the charge station.

FIGS. 14A and 14B show the loading and unloading apparatus set underground, in which the mechanical arms of parallel type are equipped with a PLC as its control system, joint arms 325 and its driving means 327. The joint arms are for engaging with joint openings 207 for cavity 220 of electric driven bus 200. The charge station 400 is set up under the road surface where the electric bus 200 runs and includes cassette battery sets 204 placed layer over layer and charging shelf 401. A fast parallel exchanging apparatus 392 comprises a parallel moving platform 380, track wheels 381, track 382 and vertical lift apparatus 383. The fast parallel exchanging apparatus also has a moving means same as that in the loading and unloading apparatus of ground type.

The joint openings 207 of the electric driven bus is engaged with joint arms 325 while the cassette battery set 204 is exchanged. The charging shelves in the underground charge station are equipped with same temperature control mean as that in the charge station of ground type. The advantages of underground charge station lie in that it occupies small space, looks beautiful, is easy to arrange and has simple structure of parallel type mechanical arms. Under an instruction from the control center 100, it can in advance take out a cassette battery set corresponding to a bus that will return to the station, and then operate a quick exchange for cassette battery set 204. The exchange procedure may be in such way that: when its control system receives a command from control center 100, the A lift arms 392 in mechanical arms of parallel type take out the corresponding charged cassette battery set in advance, and move in parallel to a predetermined parking position for the electric driven bus and wait; after the electric driven bus stops at the position automatically, the B lift arms 391 take out the used cassette battery set 204, and lower to a position on a layer corresponding to this used cassette battery; after the mechanical arms move a position of a cassette battery set in parallel, the lift arms A with the charged cassette battery set lift to the position of the cavity 220 in the bus, and insert the charged cassette battery set into it; and, after the housing of the cassette battery set is locked, the joint arms 325 are withdrawn. Then the electric driven bus 200 can run out for next operation circle. At this moment, arms B of parallel type mechanical arms place the used cassette battery set into its corresponding layer in the charging shelf And then arms B may take out another charged battery set and wait for another exchanging procedure for next bus.

Figure 15:
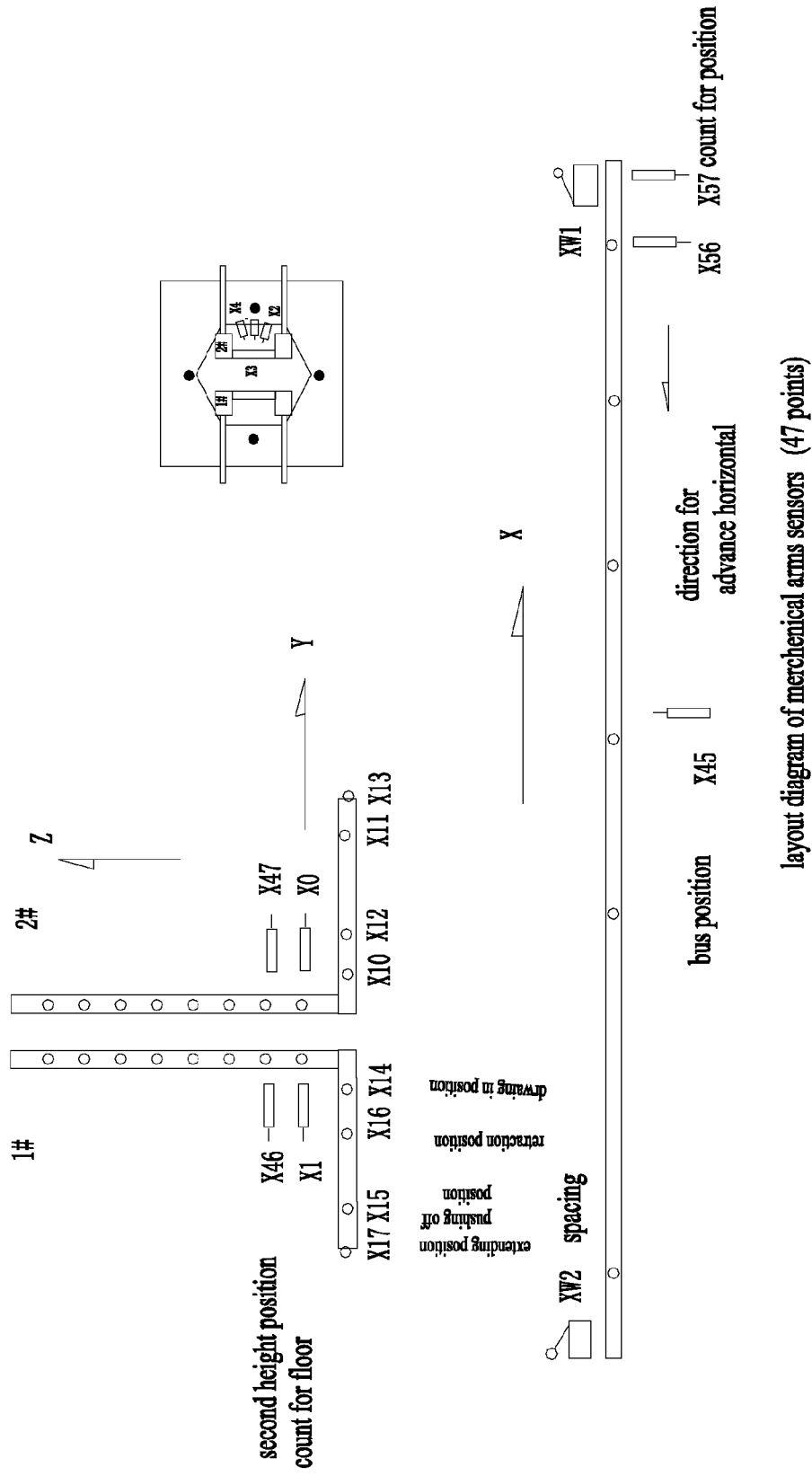
FIG. 15 is a layout diagram of sensors on the mechanical arms.
Figure 16:
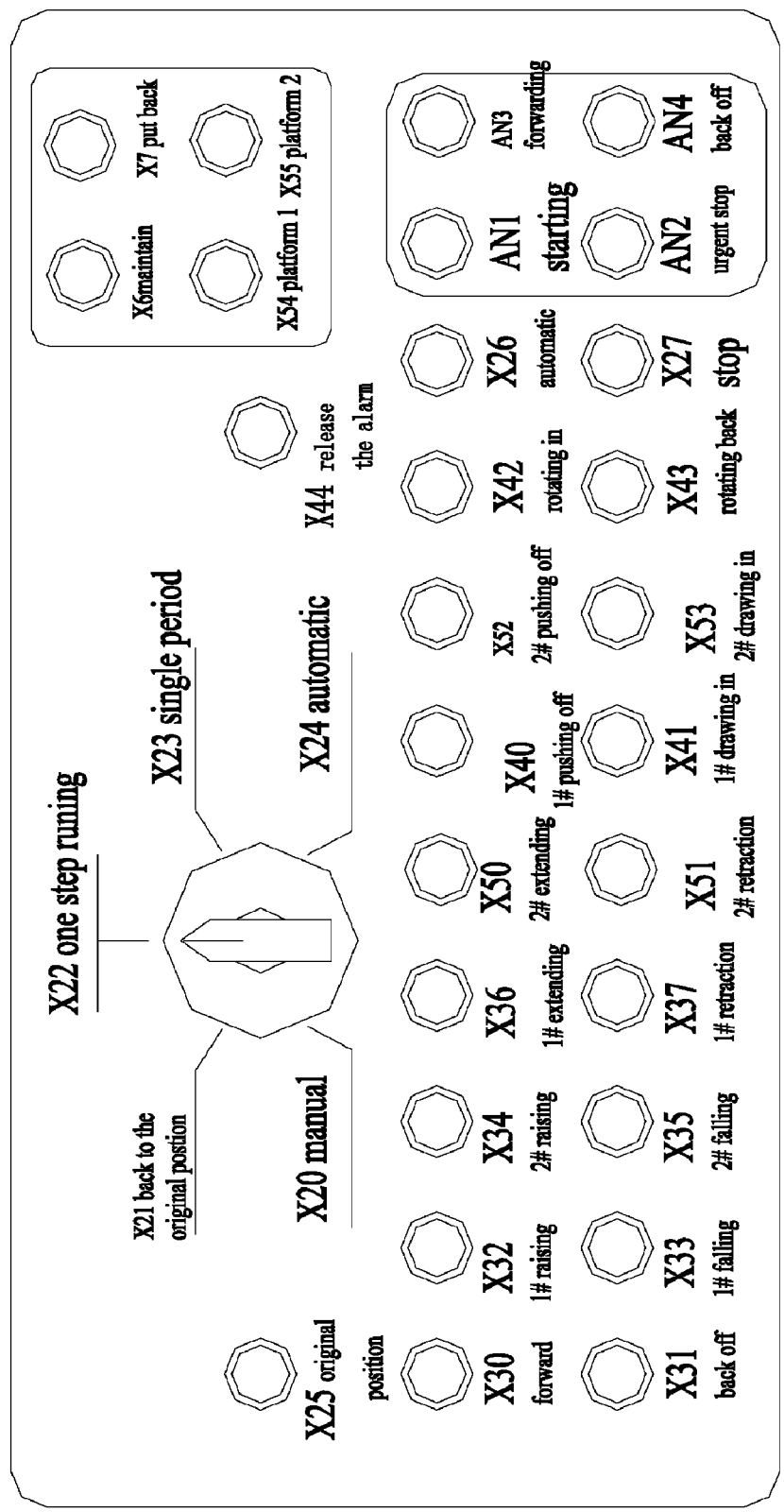
FIG. 16 is a schematic view of manual debug and the control panel of mechanical arms.

FIGS. 15 and 16 shows an embodiment with arrangement of sensors and control panel of the mechanical arms. A plurality of sensors are positioned along the horizontal track and vertical arms of mechanical arms for controlling operation of the mechanical arms, such as lifting, moving and rotating. It is obvious that the person skilled in the art may also employ other control panels with similar arrangements, which may result in same effects.

Figure 17:
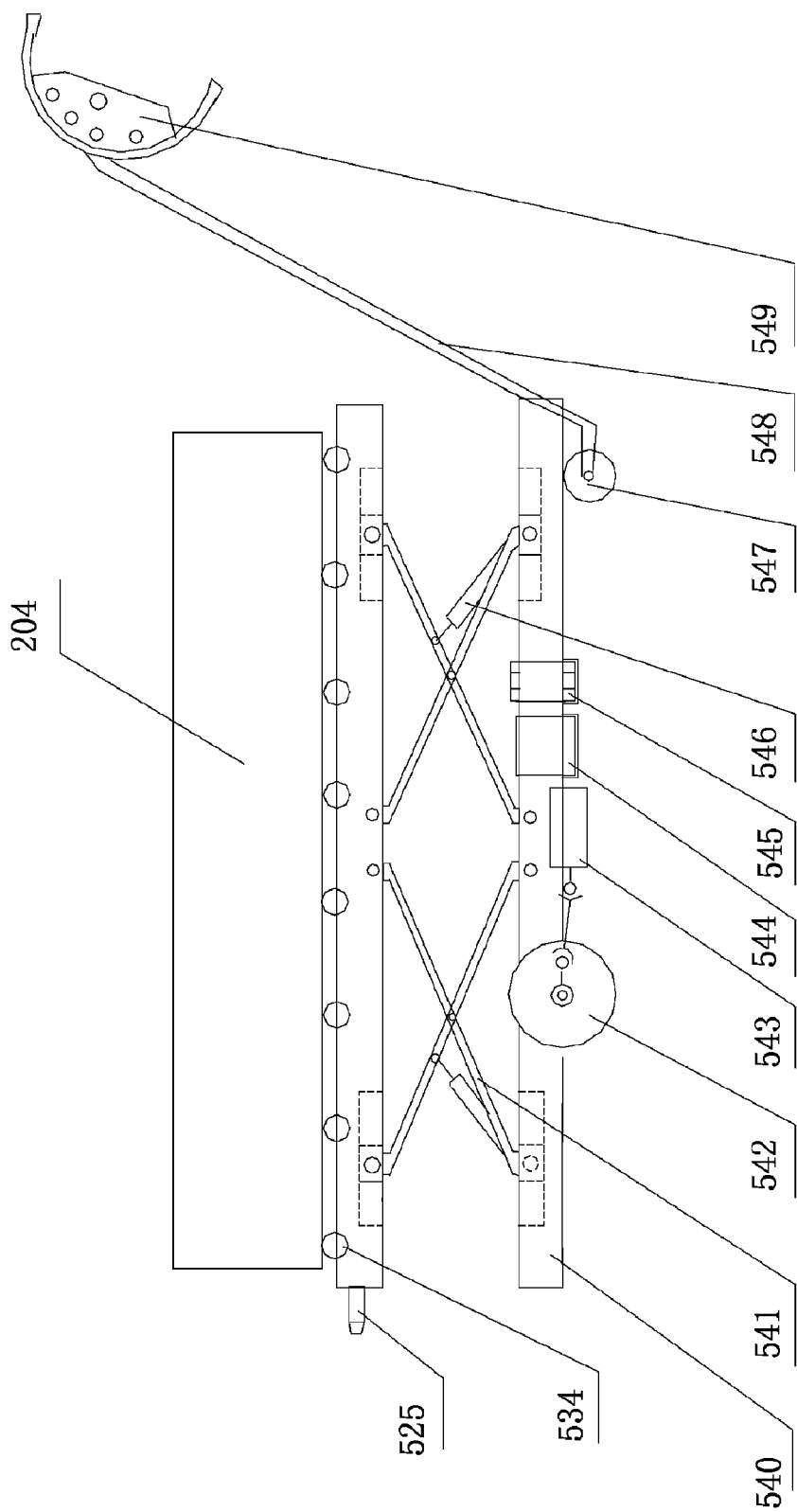
FIG. 17 is a schematic view of semi-automatic mechanical arms for exchanging cassette battery set.

As shown in FIG. 17, the electric public transit system of the present invention may be further equipped with semi-automatic mechanical arms 540 for exchanging cassette battery set in emergency. Semi-automatic mechanical arms 540 include tray 534 for supporting cassette battery set 204, joint arms 525, and a bottom plane on which are equipped scissor type lift mechanism 541 for lifting tray 534 and lift hydraulic cylinder 546. On the bottom plane are further equipped with main wheels 542 driven by a drive means 543 and auxiliary wheel 547 controlled by manual through a control handle 548. On the bottom frame are equipped with hydraulic system 545 and battery 544 to ensure that such semi-automatic mechanical arms is a semi-automatic controlled device. The control handle 548 may further include a control panel 549 to exchange cassette battery set for electric driven bus by manual, which can control it to lift, down, and move forward and backward. This device ensures that in emergent situation, such as no power temporarily or other defects, a charged cassette battery set on the charging shelf can be delivered into the electric driven bus.

3. Charge Station

Figure 18:
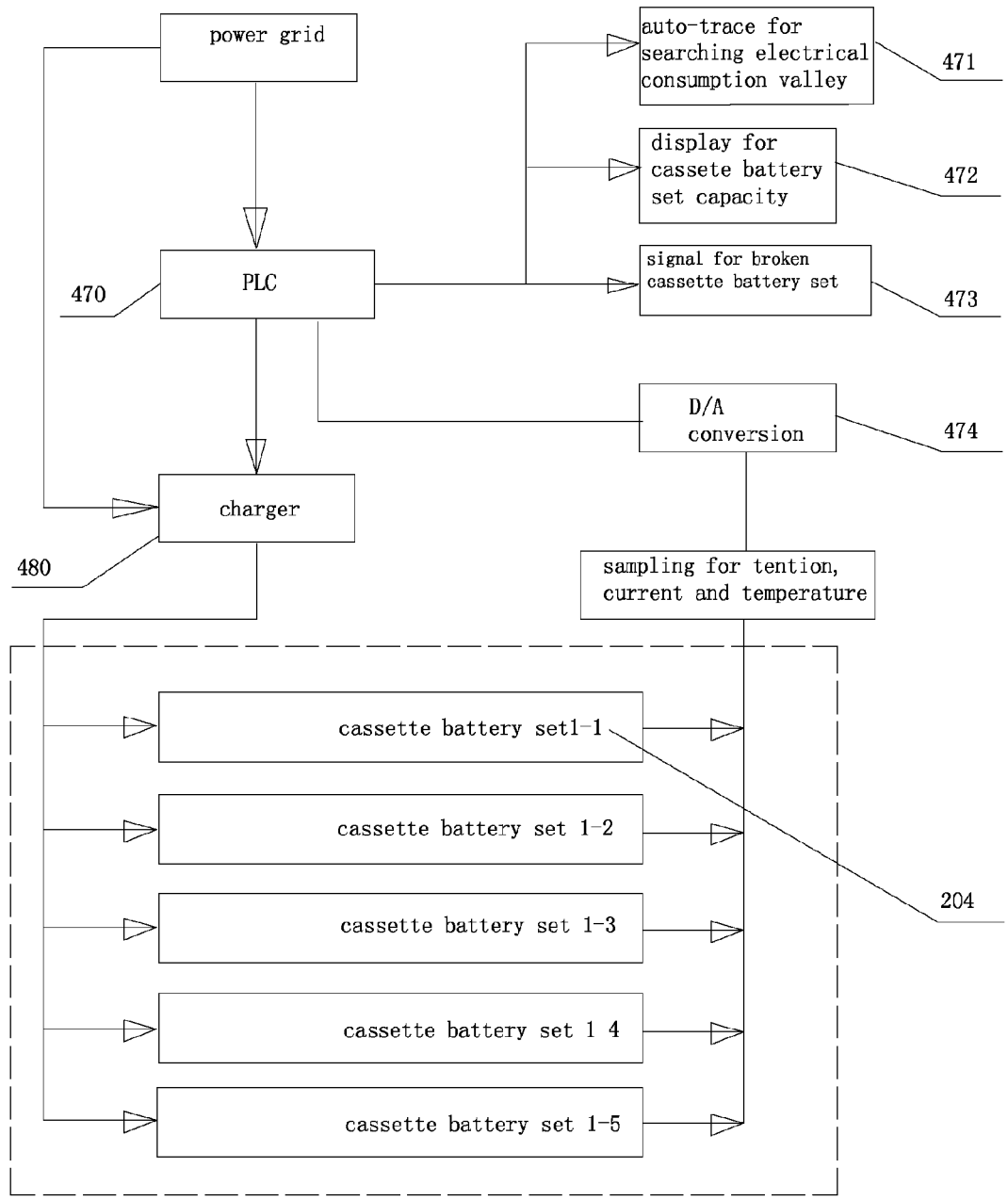
FIG. 18 is a schematic view of a charge station.

FIGS. 18, 19A and 19B show the structure of a charge station and the principle diagram of charging shelves. The charge station 400 includes a programmable logic controller PLC 470, charging shelves 401 and chargers 480. The chargers 480 have functions to regulate voltage and current and rectify current. The charge station further includes a power grid auto-trace apparatus 471 for searching electrical consumption valleys, capacity displayer 472 for displaying capacity of cassette battery set, temperature measure and control means 473 for measuring and controlling temperature of cassette battery set, and sampling means 474 for power grid, current and voltage. Charging shelves 401 include a plurality of cavities to contain cassette battery sets 204 for charging.

Charging shelves 401 are equipped with crocodile clamp contact means 440, roller means 402 and joint openings 407 for engaging joint arms of loading and unloading apparatus

300. The crocodile clamp contact means 440 have same structures as the electric connection means on the hanger frame on the chassis of electric driven bus 200.

Said charging shelves further include charging cable case 450 for connecting with the chargers, cable case door and maintain door 460. It is convenient for maintaining cables and charging contact means through opening the back door and ensuring the sealed state. Automatic closable doors 421 are set up at entrances for the cassette battery sets on the front surface of charging shelves to ensure relative isolation of the shelves from the external environment. Temperature control means 431 and drive means 432 may be further included within charging shelves. Common air conditioning compressors and temperature controllers may be utilized so as to ensure constant temperatures during charging and keep the cassette battery sets in the best working temperature ranges. A defender shed may be set on the charging shelves 401 for improve the working environment of the entire system in climate, such as rain and snow.

The power grid auto-trace apparatus 471 can scan voltage data of power grid at all period of time every day, automatically trace and record variation of the data based on differences on times of different valleys of power grid caused by differences in areas and seasons, and make a curve of week average from the variation curve to automatically adjust time periods for charging with full current in the chargers. On the basis of the data on charging shelves and cassette battery sets collected by sampling means 474, the temperatures within the charging shelves are adjusted according to predetermined categories and models of cassette battery sets 204, so as to ensure the cassette battery sets 204 always working at best charging or discharging temperature ranges for a long period, which can improve service life of the cassette battery sets in circulation. The above means 473 and 474 can provide the best charging environment for the cassette battery sets according to their categories and models.

Figure 20:
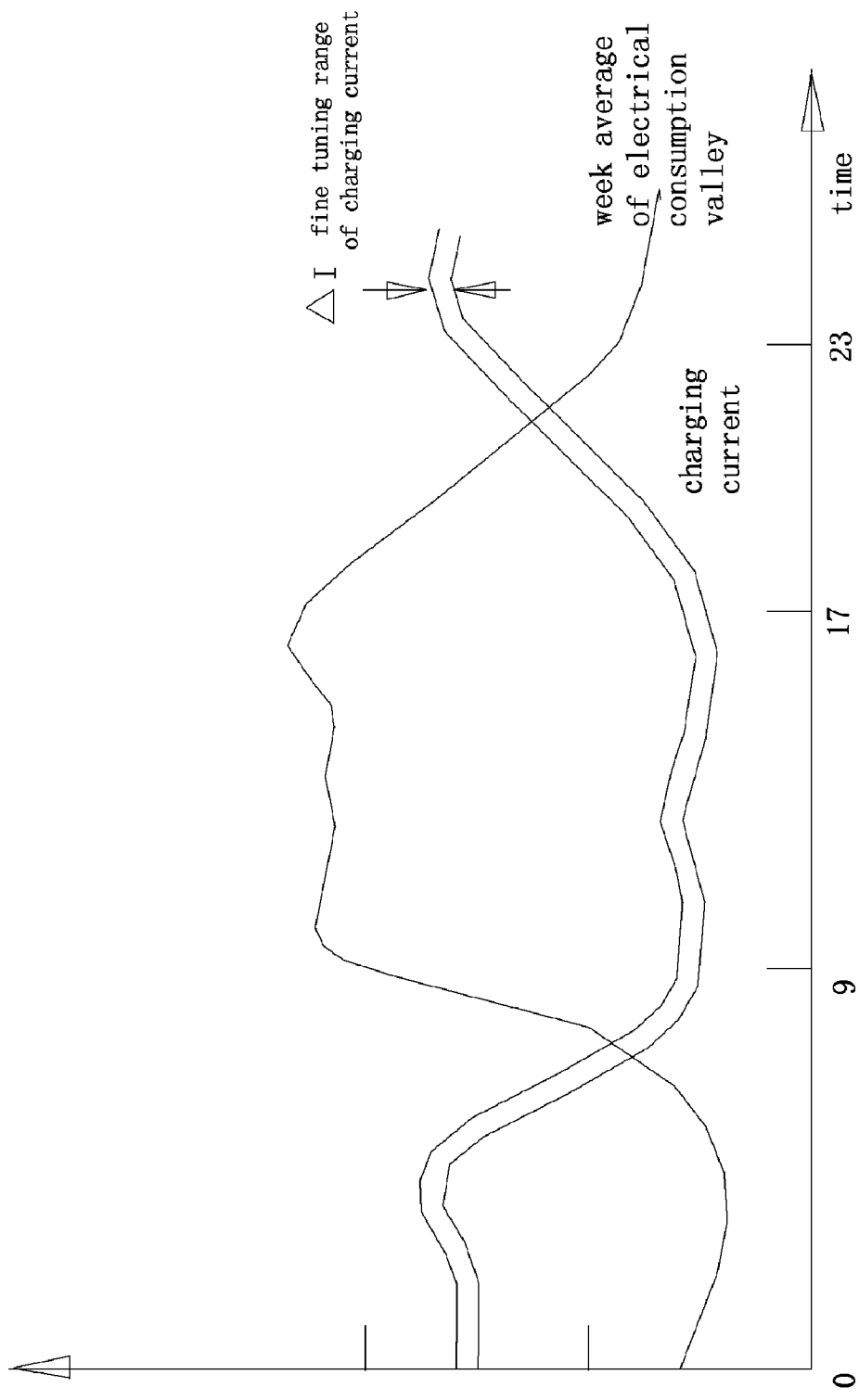
FIG. 20 is a self-adaptive charging curve with the power consumption curve in the power grid.

FIG. 20 shows curves for intelligently charging the cassette battery sets, in which the single thin line is a typical curve of variation in power consumption valleys of a city power grid, two solid lines show a charging time curve. Programmable logic controller 470 controls the chargers 480 to charge the cassette battery sets according to the charging time curve determined by the power grid auto-trace apparatus 471 for consumption valleys, which can completely evade peaks on the power consumption of power grid and guarantee that power for charging comes from 23:00 pm to 7:00 am. A current fine tuning range is ΔI. The current fine tuning range in main charging period is for ensuring the intelligent chargers to automatically identify discharging depth, current capacity and current charging state of the cassette battery set, and automatically tune finely charging current, so that the cassette batter set is charged into 100% capacity in consumption valleys. During daytime periods in peaks on consumption of the city power grid, programmable logic controller 470 can control the chargers 480 to charge the cassette battery sets with float charge current so as to ensure the cassette battery sets a long service life in circulation.

Figure 21:
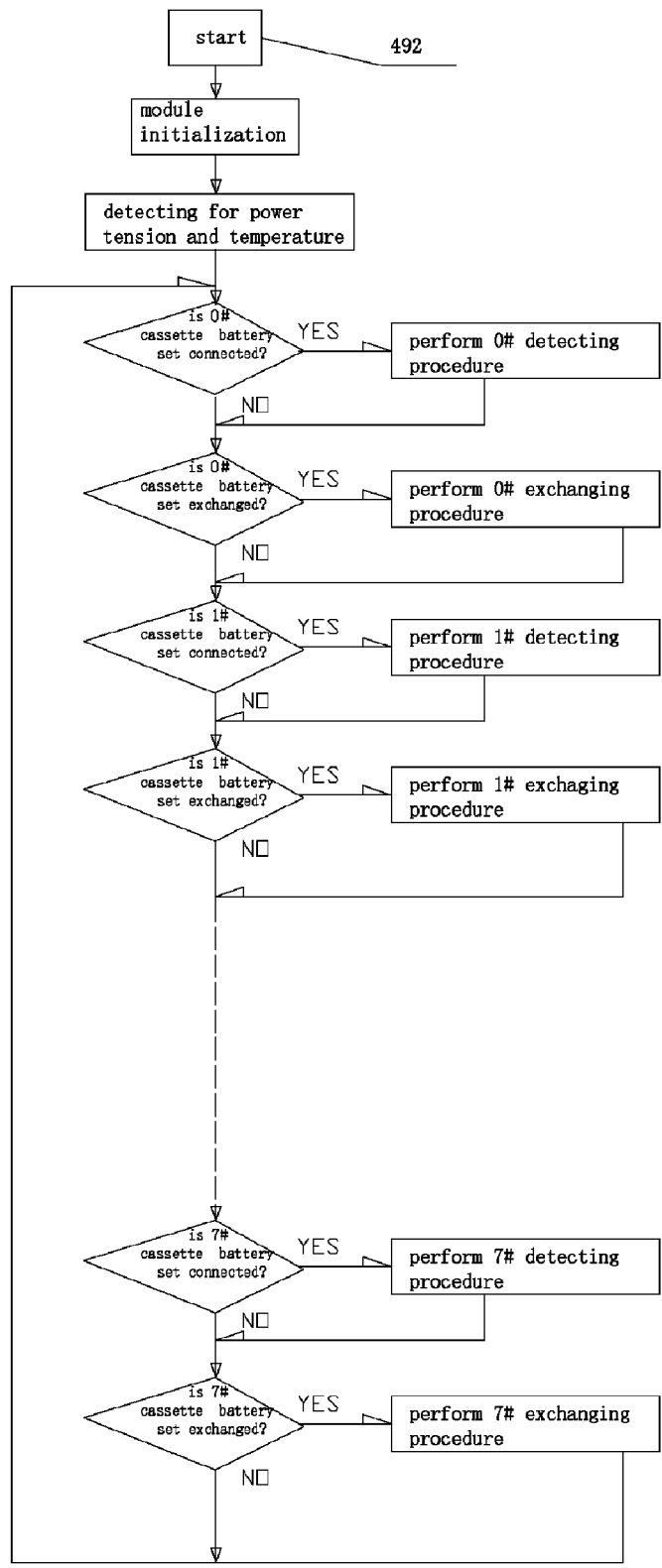
FIG. 21 is a block diagram of a scanning & detecting procedure of a charging shelf at a charge station.

As shown in FIG. 21, the exchanging procedure 492 controlled by charging shelf 401 at charge station 400 includes the following: after receiving a signal sent by control center that an electric driven bus will return to the charge station to exchange battery set, the charge control system controls to cut the power to the charged cassette battery set to be taken in corresponding layer within the charge shelf by closing the corresponding relay on the charging shelf 401; then connect the power to the used cassette battery set just placed in a corresponding layer after the cassette battery set is exchanged, and start a new charging process.

Figure 22:
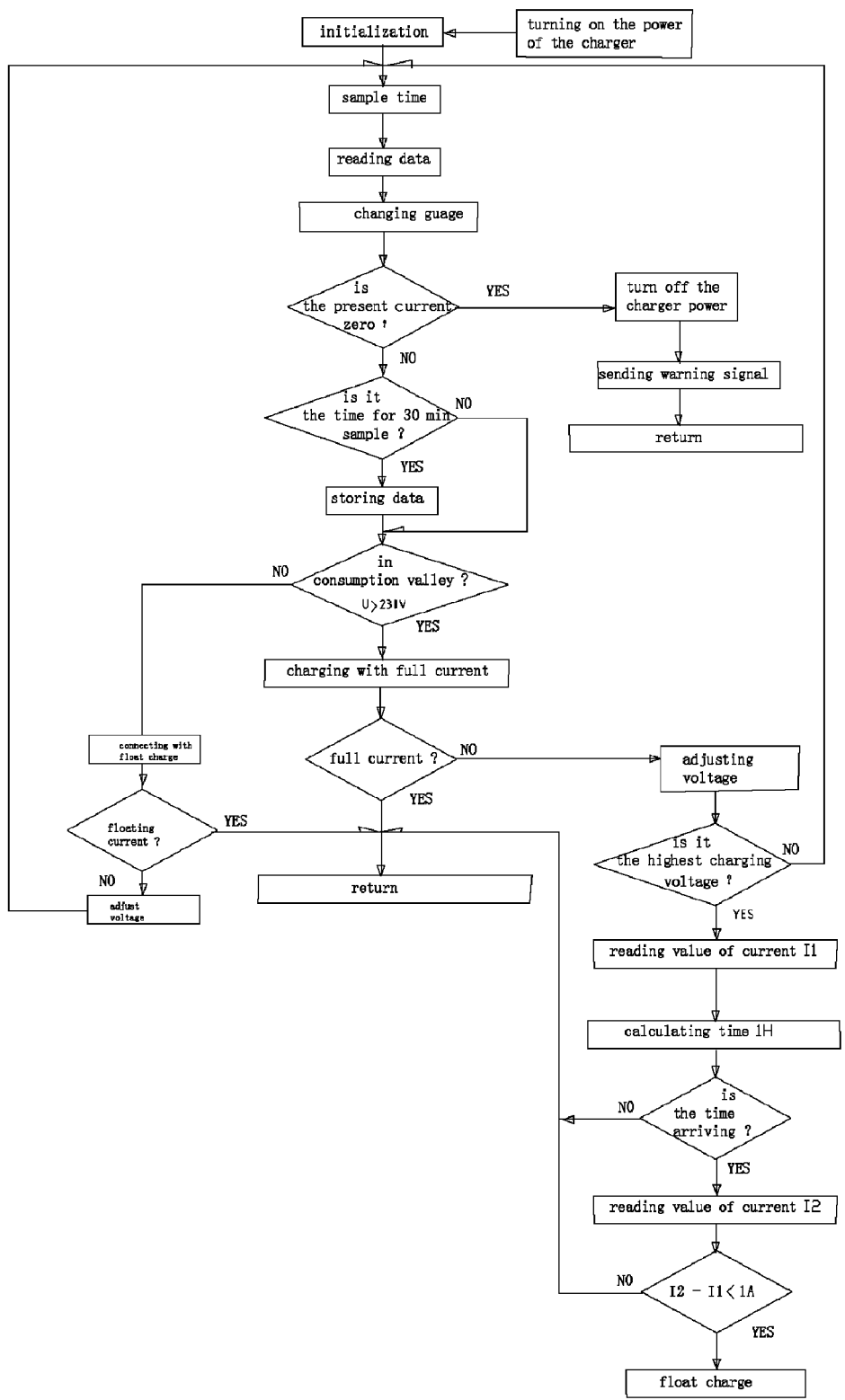
FIG. 22 is a charging procedure block diagram of a charge station.

As shown in FIG. 22, the procedure for charging the cassette battery set includes the following steps: the power of the charger is connected; the charge control system reads data of the cassette battery set; the power grid auto-trace apparatus determines whether the consumption of power grid is in valleys or not, if yes, the charge control system controls the charger to charge the cassette battery set with full charging current until the cassette battery set is fully charged; if no, the charge control system controls chargers to charge the cassette battery set with float charging current; and the charger control system determines whether the charging of the cassette battery set is complete or not, if yes, a float charging procedure starts, whereby that the cassette battery set are at least in the float charging procedure all the time except being used in the electric driven bus; and the state data for charging the cassette battery set is returned to the charge control system.

4. Control System of the Electric Public Transit System and Communication Protocol Every cassette battery set of the present invention is suitable for each electric driven bus to run over 40 kilometers. In order to meet a demand of each electric driven bus for a whole day operation, at least two cassette battery sets can be prepared in corresponding charging shelves at the charge station. Because the electric driven bus operates in a fixed line with fixed stops at fixed schedule, each mileage of the bus under each cassette battery set regularly exchanged depends on the kind, the type, the model, the performance, the service time and the discharge depth of the cassette battery set. Generally a cassette battery set is exchanged when its discharge depth is up to 60% to 80%, preferably, over 70%. Before approaching the discharging depth for exchanging the cassette battery set, the bus-mounted control system warns the bus driver, and sends signals to the control center that the bus needs return for exchanging the cassette battery set. Preferably, the control center of the electric public transit system of the present invention is set up at a charge station and carries out the bi-directional communication with the charge control system by Can bus. More preferably, a programmable logic controller in the charge control system may also act as the control center simultaneously. Therefore, the control center of the present invention can be set up alone, or tied up with the charge control system to realize multiple functions of one system. As the electric driven bus gets back to the charge station set up in the terminals of the public transportation system after at least more than 40 kilometers operation, the electric driven bus is automatically controlled and oriented at a position in front of charging shelf 401 and loading and unloading apparatus 300 by communication protocol between the bus-mounted control system and charge control system. Before the electric driven bus returns to the charge station, the automatic control system of the loading and unloading apparatus has already received signals that are sent by the bus-mounted control system to the control center and oriented in advance in front of the charging shelf corresponding to the electric driven bus. After the electric driven bus stops at the position, the loading and unloading apparatus simultaneously takes the used cassette battery set from the electric driven bus 200 and a charged cassette battery set from the charging shelf respectively. After turning 180 degree, lift arms joints with corresponding positions, the charged cassette battery set is inserted into the electric driven bus 200 and the used cassette battery set is inserted into the corresponding layer within the charging shelf respectively. Then the electric driven bus may run for next operation. Therefore the present invention solves the key problem that limits the continuous operation mileage of the electric driven bus and has not overcome in the research and development for a long time in the world.

Referring to FIG. 1, each programmable logic controller in each sub-system in the electric public transit system operates in its own control system respectively. A plurality of sub-systems is combined together to form an entire control system by RS232 Can bus (or other type of serial data bus) and wireless communication means. In other words, entire automatic control system is formed by combination of the bus-mounted control sub-system construed by the control center of the electric transit system as a core and programmable logic controller mounted in the bus, the control sub-system of the mechanical arms construed by the programmable logic controller in mechanical arms for exchanging cassette battery set, and the control sub-system for intelligent charging construed by the programmable logic controllers of the charging shelves, by Can bus and wireless impulse digital signals with a priority principle of the electric bus. Within each sub-system, the inner communication may adopt RS232 bus (or other serial bus forms such as 422, CAN).

Control center 100 of the electric public transit system may comprise central processing unit (PC) and at least one programmable logic controller PLC, preferably two PLCs, to manage to control entire system. When receiving signals sent by the electric driven bus 200 in a form of wireless pulses that the electric driven bus with its identification number will return to charge station, the control center 100 first, on the basis of the identification number of the bus, sends a command to the loading and unloading apparatus 300 to move in front of the charging shelf unit corresponding to this bus, position at the layer corresponding to a charged cassette battery set to be exchanged, and wait. After this bus enters into the charge station, the driver drives the bus along a predetermined driving line to ensure a parallel distance between the bus and the loading and unloading apparatus less than 200 mm, whereby the joint means on the mechanical arms of the loading and unloading apparatus can exchange the cassette battery set smoothly and quickly.

Figure 23:
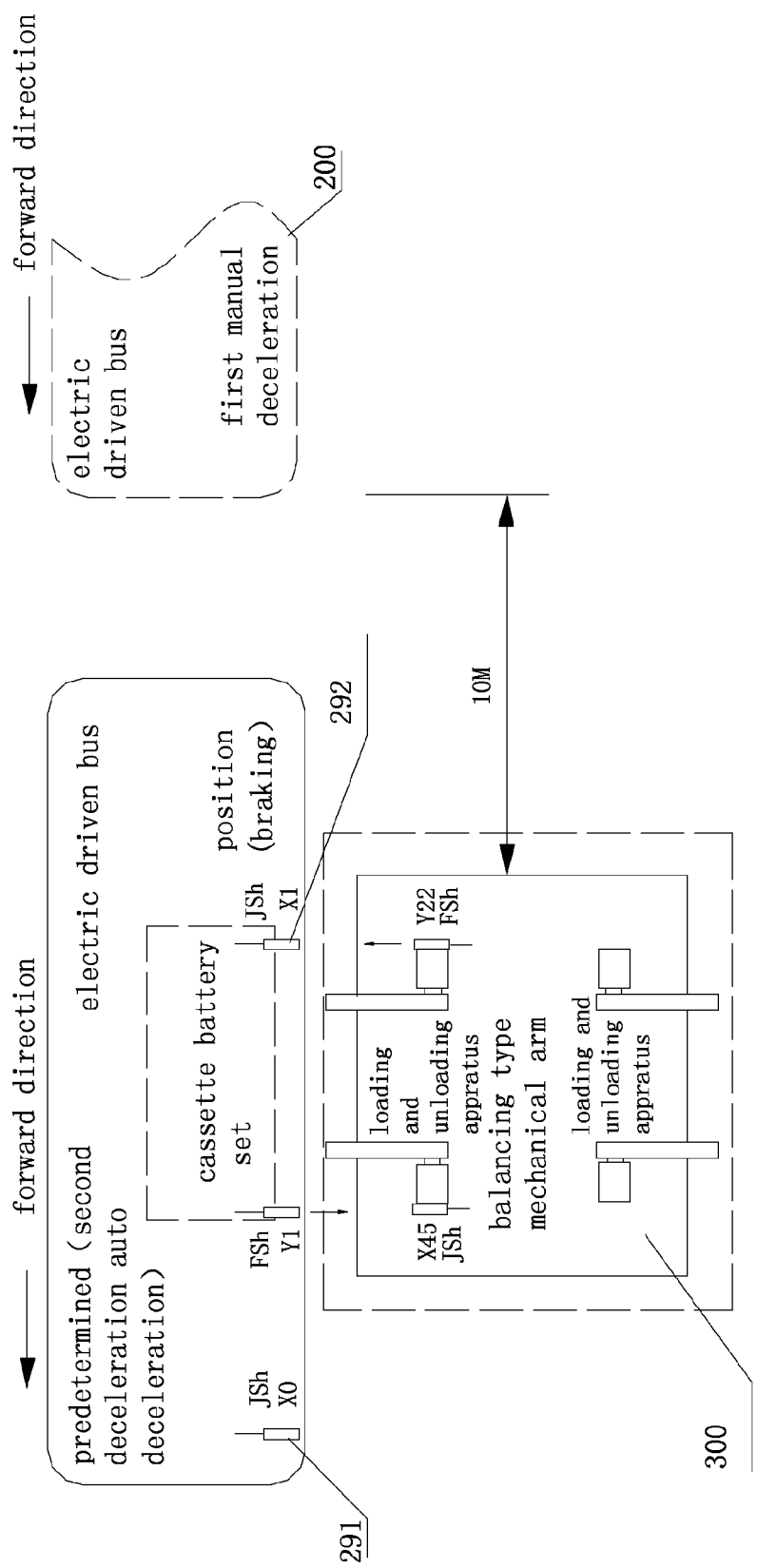
FIG. 23 is a schematic view of automatic positioning of an electric bus and mechanical arms of balance type.
Figure 24A:
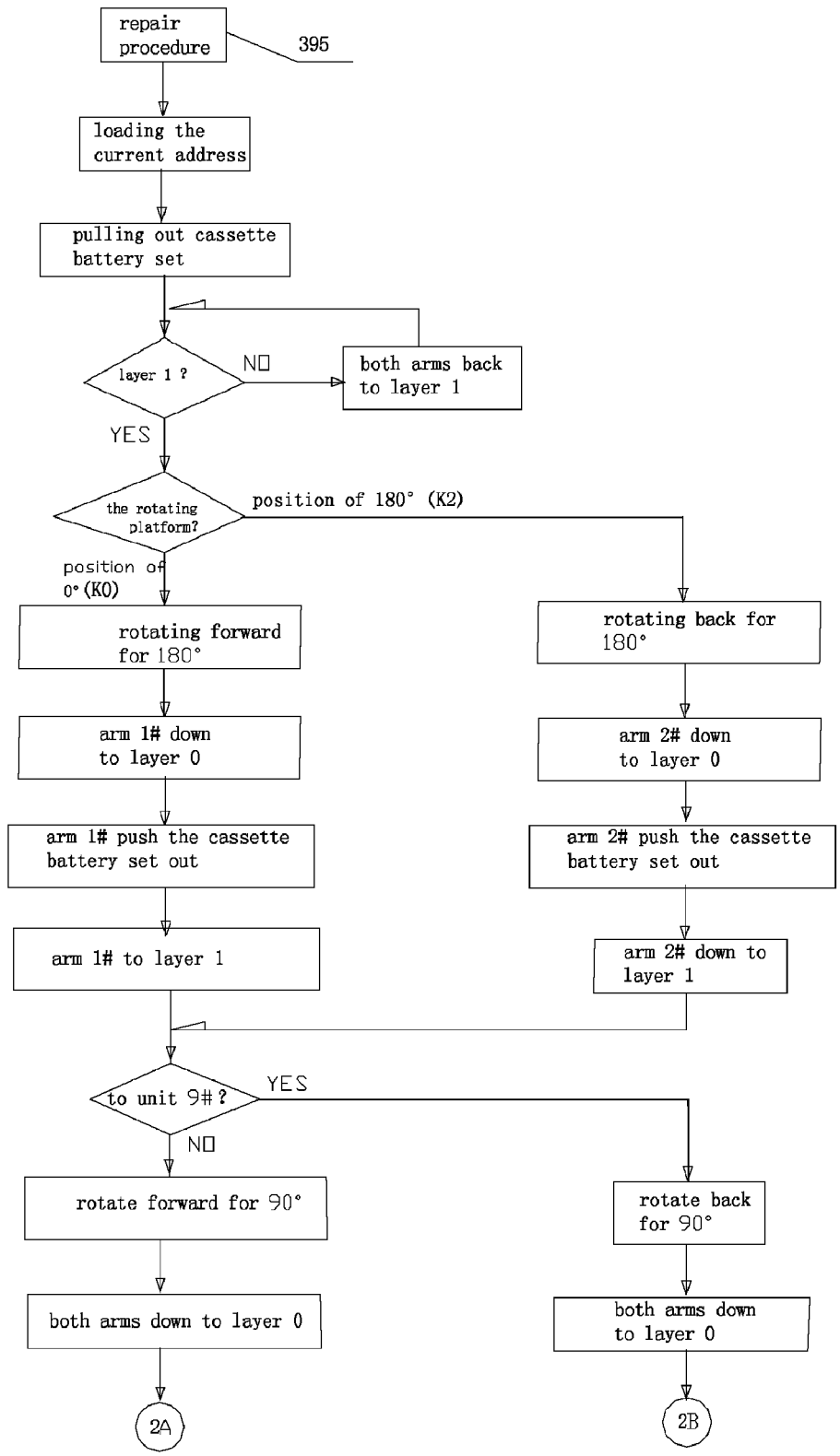
FIG. 24A is a partial block diagram of automatic control maintenance procedure for mechanical arms of balance type.
Figure 24B:
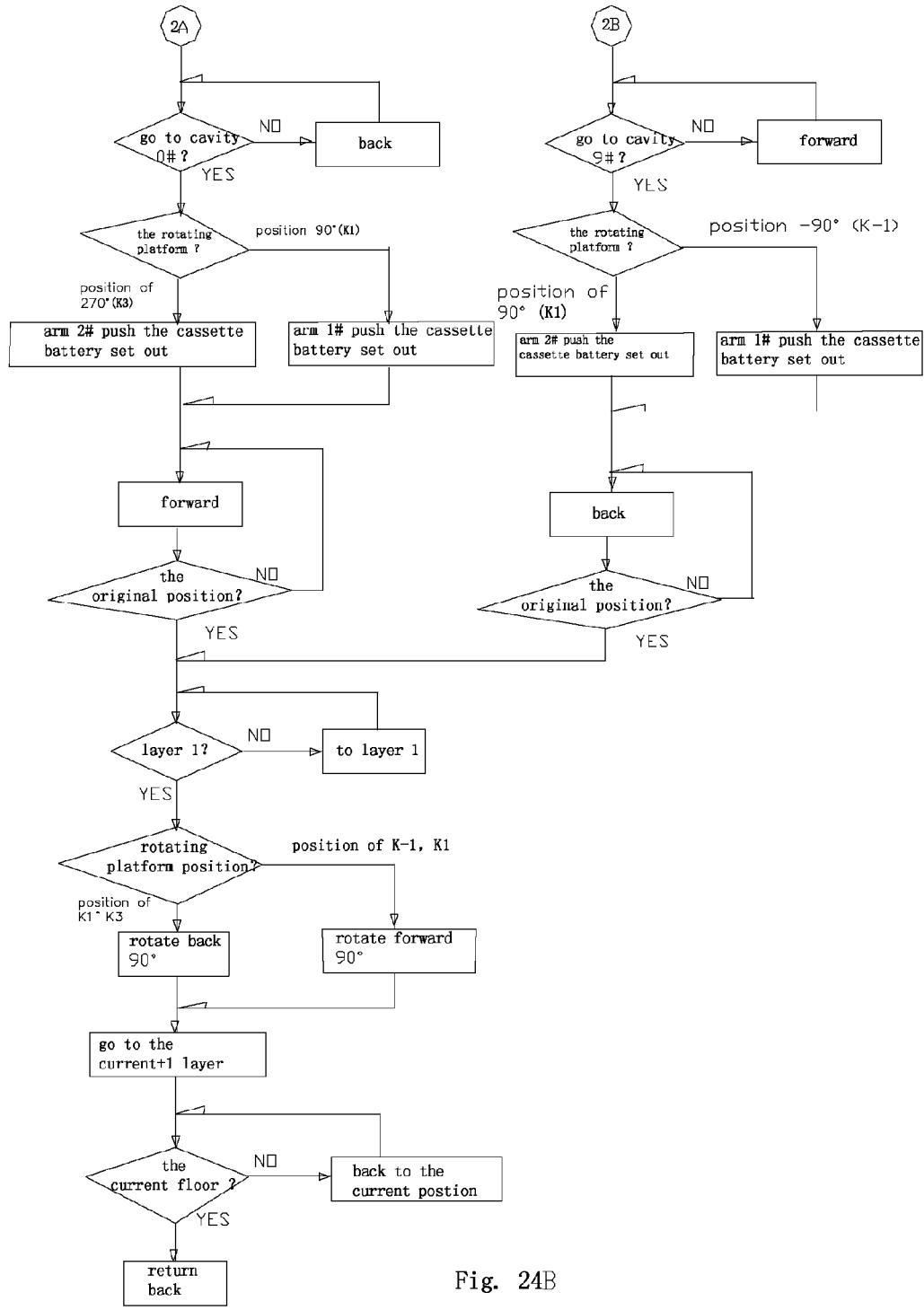
FIG. 24B is a continuity of FIG. 24A.
Figure 25A:
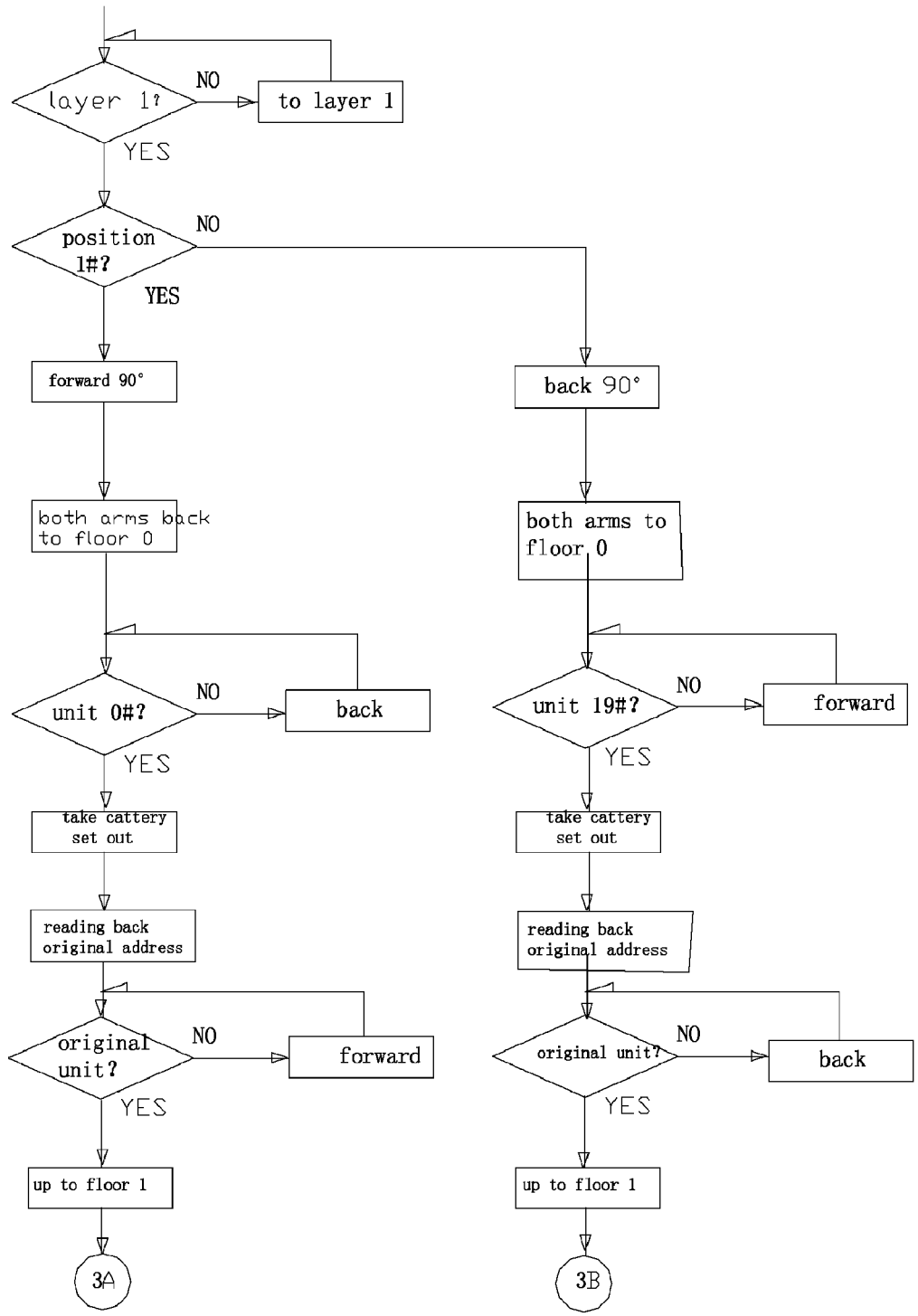
FIG. 25A is a partial block diagram of automatic control maintenance post-procedure for mechanical arms of balance type.
Figure 25B:
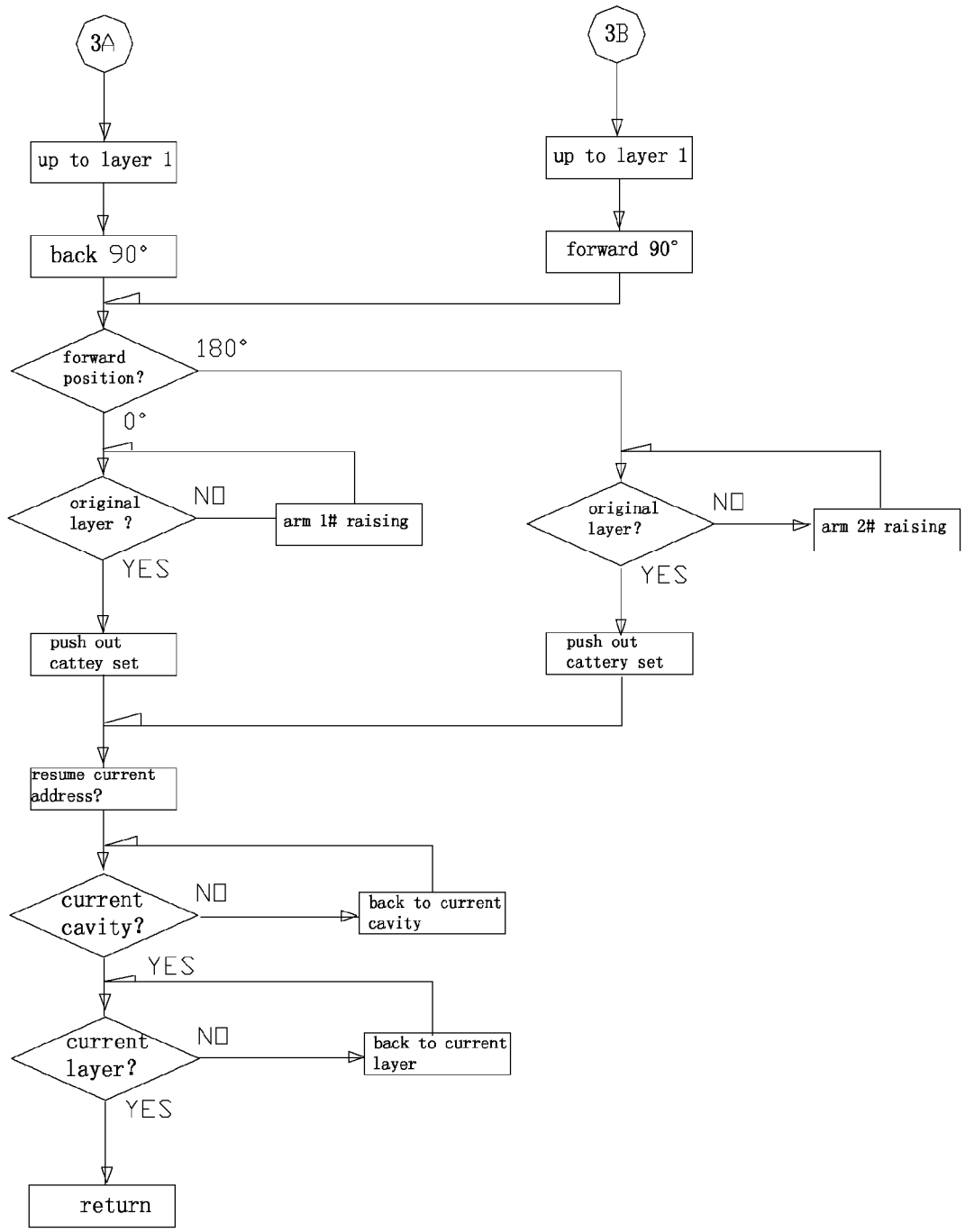
FIG. 25B is the continuity of FIG. 25A.

As shown in FIG. 23, the auto-brake orienting system may be used other than relying on the driver's operation in order to ensure the electric bus oriented accurately. When the electric driven bus closes to the mechanical arms of the loading and unloading apparatus at a suitable distance, the bus-mounted programmable logic controller decelerates the bus to a predetermined speed. When passing the first predetermined position 291, the bus is decelerated to a lower predetermined speed, and finally stops completely at a second predetermined position 292. When finishing the procedure for exchanging the cassette battery set, the mechanical arms withdraw their joint arms, the bus-mounted programmable logic controller finishes the locking and electric connection procedures and then instructs the driver to begin another operation round. A quick and easy procedure for exchanging the cassette battery set is done.

FIGS. 24A, 24B and FIGS. 25A, 25B show the repair procedure for broken cassette battery set and post-repair procedure 395, 396 respectively. After the bus returns to the charge station, the mechanical arms take the broken cassette battery set from the cavity in the electric driven bus, then rotate 90° and deliver to the repair platform 500 for repairing. Then, the mechanical arms back to the original position to wait for the next command sent by its control system. The repair worker sends the signal to the control center when having repaired the broken battery set. The control system of mechanical arms receives a command from the control center 100, and then take the repaired cassette battery set back and put it to its corresponding layer in the charging shelf according to its identification number detected.

Figure 26A:
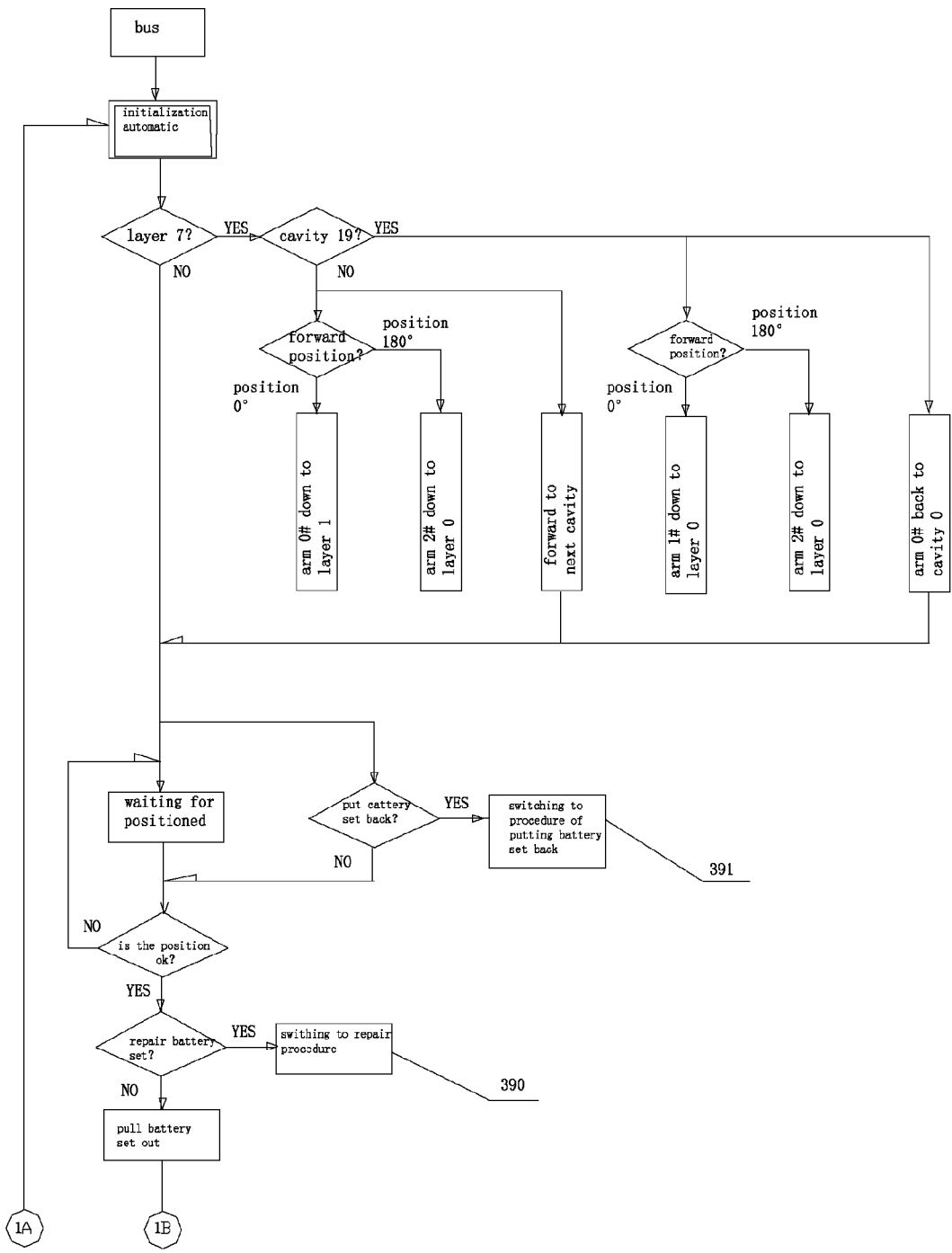
FIG. 26A is a partial block diagram of automatic control procedure mechanical arms of balance type.
Figure 26B:
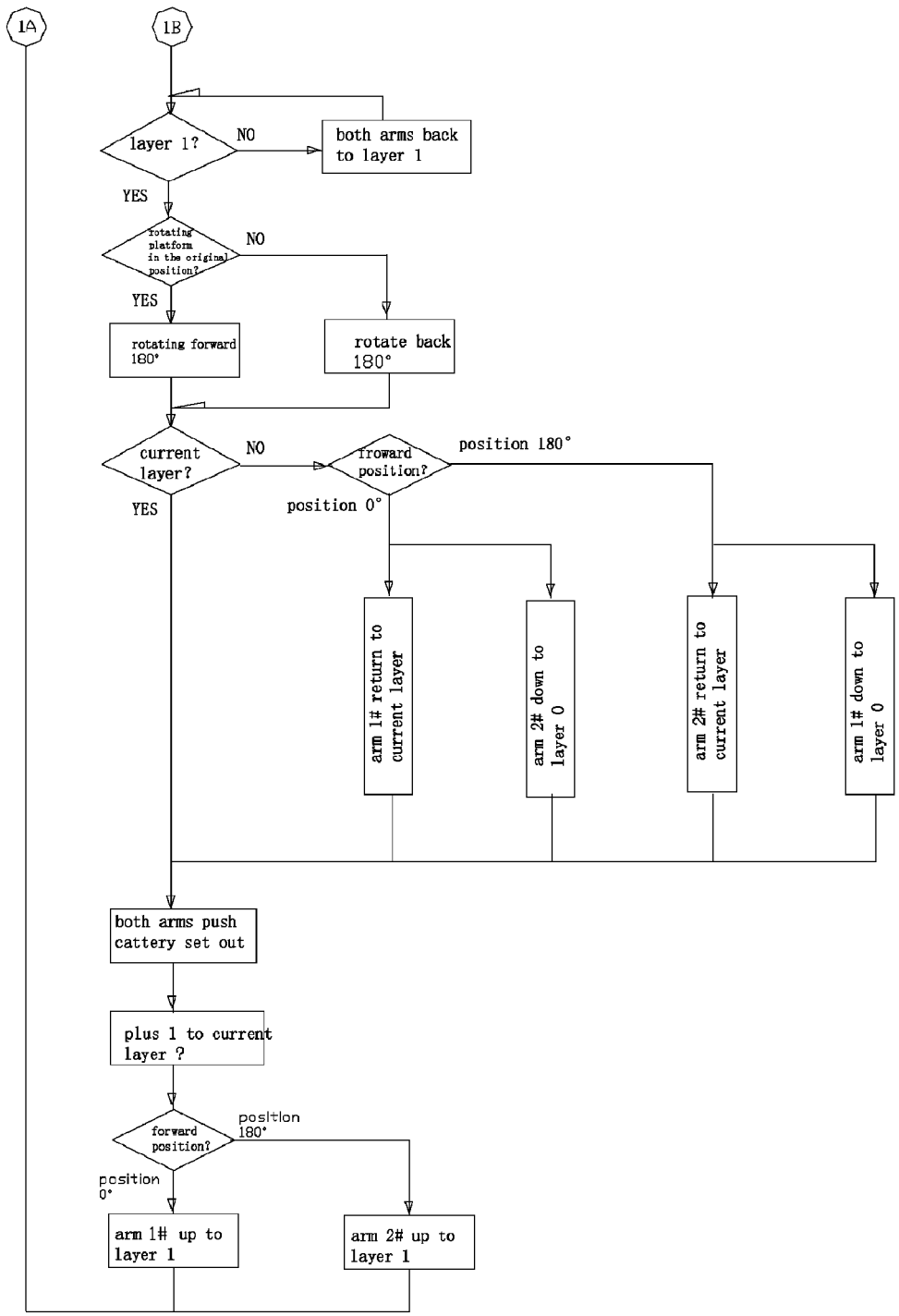
FIG. 26B is the continuity of FIG. 26A.

As shown in FIGS. 26A and 26B, when receiving a command from the control center that the electric driven bus will return to the charge station, the control system of mechanical arms first judge whether the mechanical arms locate at the position in front of the charging shelf corresponding to the returning electric driven bus or not; if yes, wait there for the bus; if no, move to the position in front of the charging shelf corresponding to the returning electric driven bus and get ready to take both the used cassette battery set from the electric driven bus and a charged cassette battery set in the charging shelf. Then the control system operates the procedure for exchanging the cassette battery set as the electric driven bus is oriented at the position. If a group of battery units is detected unable to work, then it goes to the procedure for repairing the failed cassette battery set (shown in FIGS. 24-25); otherwise it controls to take the used cassette battery set from the electric driven bus and put it to its corresponding layer in the charging shelf, and operate the charging procedure (as shown in FIGS. 21-22).

Figure 27:
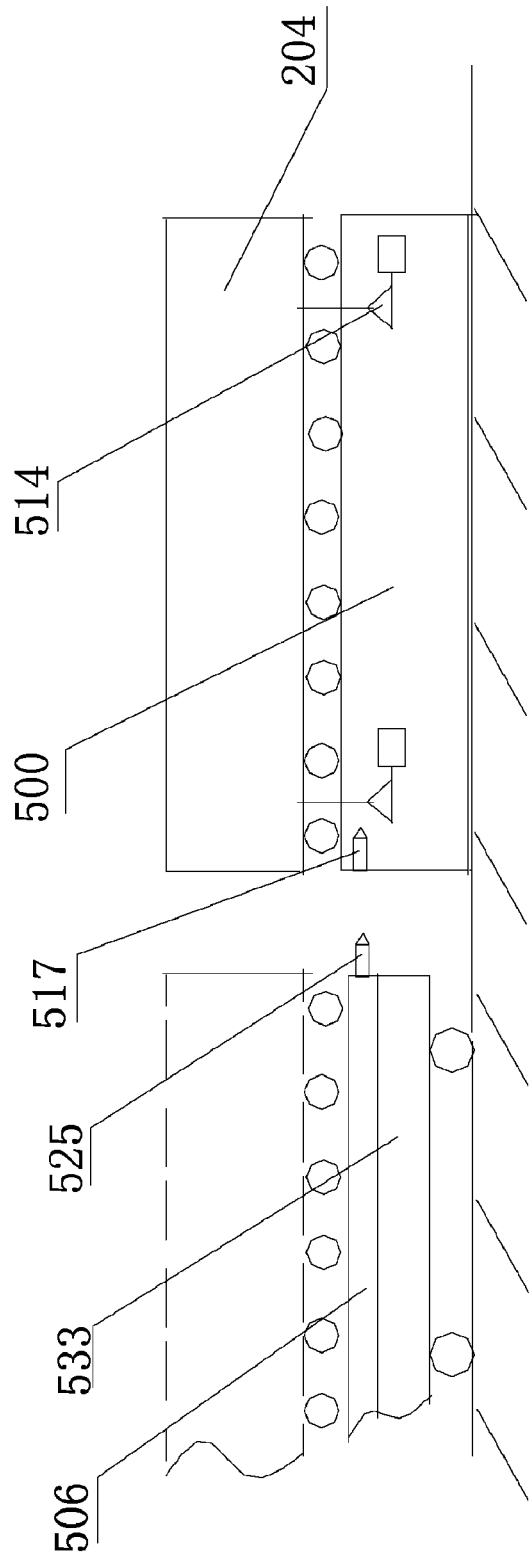
FIG. 27 is a schematic view of repair platform for cassette battery sets.

As shown in FIG. 27, the repair platform 500 relating to the repair procedure has joint openings 517 and locking means 514. The joint opening is corresponding to the joint arms in mechanical arms of loading and unloading apparatus.

Figure 28:
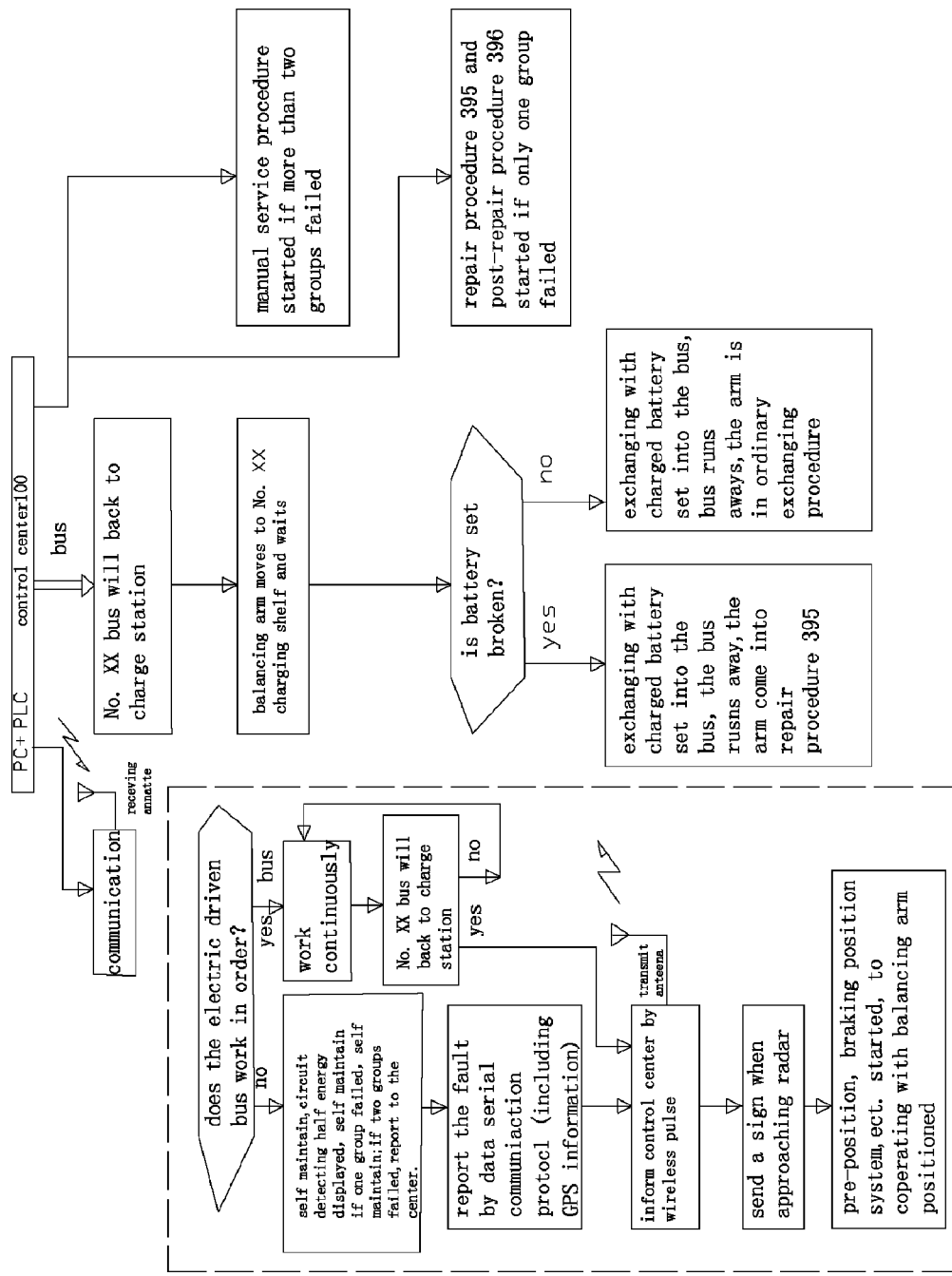
FIG. 28 is a schematic view of communication and control system for the electric public transit system.

As shown in FIG. 28, when one group of battery units is unable to work in the cassette battery set as the electric driven bus runs on the road, the bus-mounted PLC of the driven electric bus will send digital signals to the control center in the form of wireless pulses. The signals include information about the failed group of battery units in the cassette battery set and the GPS (Global Position System) message on geographical position of the electric driven bus. Then the control center will send a command to the mechanical arms for preparing a repair procedure (as shown in FIGS. 24-25, the repair procedure 390 and post-repair procedure 391). If more than two groups of battery units in the cassette battery set are unable to work, the control center may command the urgent service system 600 to start the rescue procedure. If the electric driven bus needs to exchange battery set in its regular operation, the control center 100 will command the loading and unloading apparatus 300 to orient at the corresponding position in front of the cassette battery set in the charging shelf 401 at charge station 400. While the electric driven bus drives into the charge station and orients in front of the loading and unloading apparatus 300, the mechanical arms of the loading and unloading apparatus 300 will operate a regular procedure for exchanging cassette battery set (as shown in FIG. 26, which shows the regular exchanging procedure). If a group of battery units in the cassette battery set is unable to work, the electric driven bus sends signals to the control center 100 through a communication protocol, the control center 100 sends a command, and then the loading and unloading apparatus 300 operates a repair procedure. The loading and unloading apparatus takes a charged battery set from the charging shelf 401 and put it into the electric driven bus 200, which will run a regular operation. The broken battery set 204 is taken to the repair platform 500 (FIG. 27 shows the structure of repair platform 500), which is placed within the charge station, for manual maintenance and repair. After the cassette battery set is repaired and maintained, the repair worker sends signals to control center 100 by can bus, the control center 100 commands the mechanical arms of the loading and unloading apparatus 300 to carry out the post-repair procedure (as in FIG. 25, which shows the post-repair procedure 391), and put the repaired battery set back to its corresponding layer in charging shelf to be charged (referred to FIGS. 21 and 22, the procedures for loading the cassette battery set on the charging shelf and charging). If the bus-mounted PLC 260 sends a protocol signal that two or more groups of battery units in the cassette battery set are unable to work, the control center 100 may command the urgent service system 600 to send a rescue vehicle 601 to the site where the bus failed according to the information on GPS geographical position sent by the bus-mounted control system.

The high-tension section of the cassette battery set provides a power for the main motor that drives the electric driven bus 200. The low-tension section of the cassette battery set provides a power for other appliances on the bus, such as lights and speaker. The high-tension section of the cassette battery set is charged by a high-tension charger at the charge station. The low-tension section of the cassette battery set is charged by a low-tension charger at the charge station. No power transfers between the high-tension section and the low-tension section during the operation of the bus on line so as to enhance the utilization efficiency of electric energy and the reliability of the electric power system.

Figure 29:
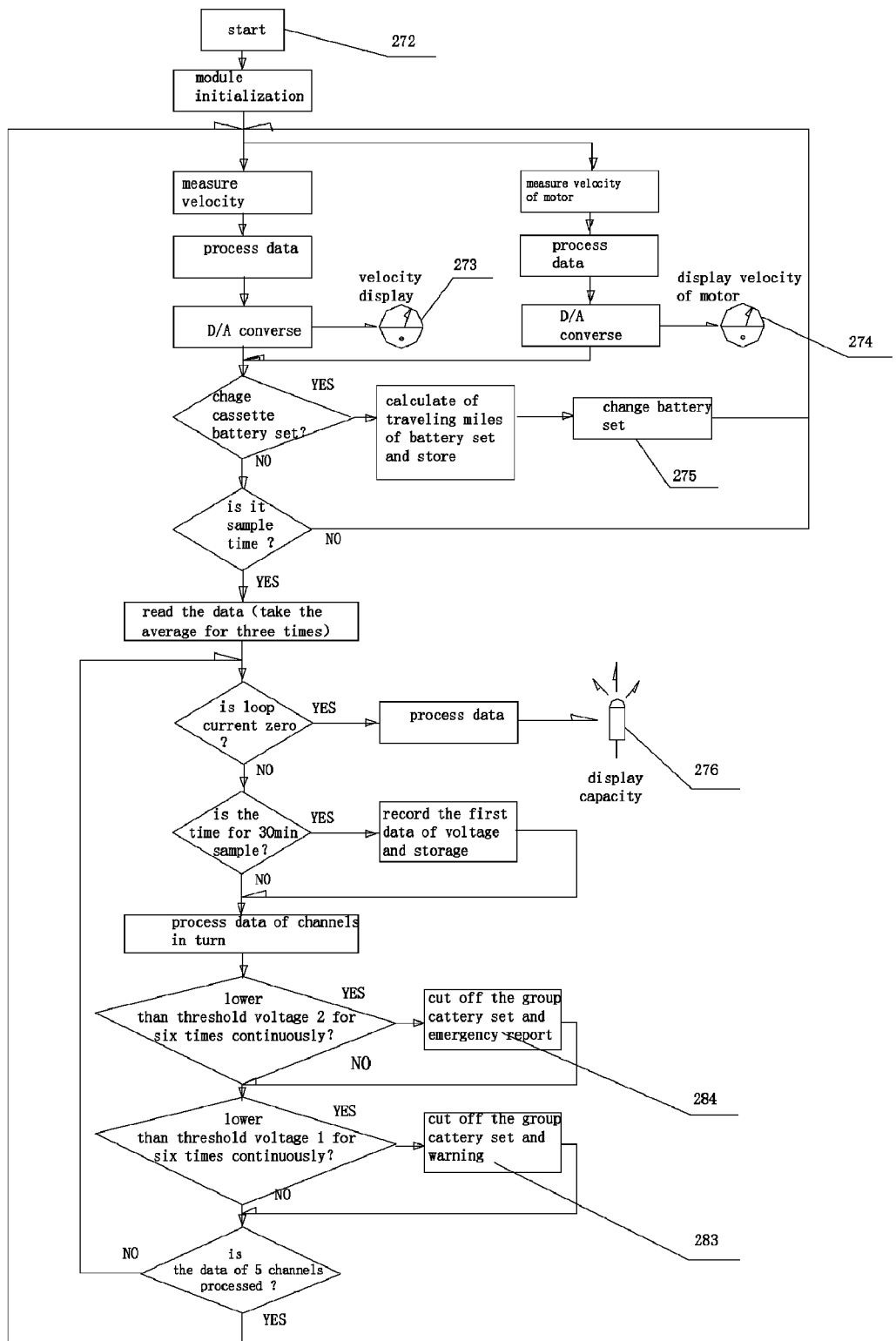
FIG. 29 is a procedure block diagram of a bus-mounted control system in an electric bus.

As shown in FIG. 29, the system control procedure 272 in the bus-mounted PLC of electric driven bus 200 may include a procedure for measuring velocity 273, a procedure for processing data, a procedure for displaying motor rotation speed 274, a procedure for exchanging cassette battery set 275, a procedure for displaying capacity of the cassette battery set 276, a procedure for scanning the cassette battery set and a procedure for cutting connection of battery unit 283, 284. The above mentioned procedures display humanized analog on the board panel before the driver for his/her reference by sensors set on the transmission axis and motor axis of the bus and by data processing and digital/analog conversion. The front end of high-tension control in bus-mounted control system scans all groups of cassette battery units by operating a sub-procedure set according to the procedure 272. If all groups of battery units in the cassette battery set are in good state, the current capacity of the cassette battery set will be displayed. If one group of battery units is unable to work, the sub-procedure 283 or 284 in the procedure 272 will be operated to cut the failed group of battery units by relays combination at the front end of high-tension control, and simultaneously warn the driver that the capacity of the cassette battery set is declined. If two or more groups of battery units are unable to work, the driver will be commanded to park the bus on the side of the road and wait for instruction from the urgent service system 600. The bus-mounted PLC sends the communication protocol including GPS information to the control center 100 by its wireless digital pulse transmitter, and then urgent service system 600 will send out the rescue vehicle 601 for urgent service.

While the electric driven bus operates, its bus-mounted control system will scan all groups of battery units in the cassette battery set 204, record their voltage data in turn and store. The current capacity of the cassette battery set is display in capacity displayer on the panel below the wheel after processing data. If the voltage of one group in the cassette battery set 204 is lower than a threshold voltage after being scanned for 6 times continually, the bus-mounted control system will cut the connection of this group to the rest of the cassette battery set by closing the corresponding relays (referred to FIG. 4) and then display the capacity of the cassette battery set as half for reminding the bus driver to return to charge station for repair. If the voltages of two groups are lower than a threshold voltage after being scanned for 6 times continually, the bus-mounted control system will start a stop procedure 284 to stop the bus, and display the capacity of the cassette battery set as zero. Then the bus will be parked on the side of the road and not allowed to run. Furthermore the information of GPS and the failure information are sent to the control center 100 and urgent service system 600 by communication protocol in the form of wireless pulse, and the bus waits for the service of rescue vehicle 601.

The electric public transit systems of the present invention are illustrated in details accompanying with the drawings, including the structures, the function and protocol communication of all parts. Any technical changes or modifications on the electric public transit system and or its components based on the specification of the present invention made by the person skilled in the art will be within the scope of the present invention.

INDUSTRIAL APPLICABILITY

The present invention may apply to public transit systems to ensure electric driven bus operating on line continuously and enhance the utilization efficiency of electric buses.

What I claim is:

1. An electric public transit system, comprising
an electric driven bus equipped with a cassette battery set and a bus-mounted control system;
a charge station placed in a predetermined place for charging cassette battery sets; and
a loading and unloading apparatus; wherein
when the bus needs change the cassette battery set, the loading and unloading apparatus unloads the cassette battery set from the bus and loads a charged cassette battery set into the bus;
the charge station is equipped with a charge control system, and the loading and unloading apparatus is equipped with a loading and unloading control system;
the loading and unloading control system, the bus-mounted control system and the charge control system are able to intercommunicate;
whereby when the loading and unloading control system receives a signal sent from the bus-mounted control system of the bus that the bus will return to the charge station, the loading and unloading control system moves the loading and unloading apparatus to a predetermined position corresponding to the bus at the charge station and waits; and
when the bus arrives at the predetermined position, the loading and unloading control system controls the loading and unloading apparatus to exchange the cassette battery set with a charged cassette battery set, whereby the bus is able to operate on line continuously;
the charge station further includes a charger, and a power grid auto-trace apparatus for searching electrical consumption data of a power grid; and
the charge control system determines whether the power grid used is in valleys based on the searching data of the power grid auto-trace apparatus;
if yes, a full charge program is started in the charger controlled by the charge control system, and the cassette battery set is charged with full current until the cassette battery set is fully charged;
if no, a float charge program is started in the charger controlled by the charge control system, and the cassette battery set is charged with float current.

2. The electric public transit system of claim 1, wherein the bus-mounted control system includes at least one PLC programmable logic controller, after the loading and unloading apparatus completes exchanging cassette battery sets, the bus-mounted control system controls to lock the cassette battery set and complete whole electrical connection within the bus;

the bus has a special chassis equipped with a hanger frame for holding the cassette battery set, the hanger frame is equipped with rollers capable of engaging with the cassette battery set and electrical connection means for implementing electrical connection with the cassette battery set;

the hanger frame is further equipped with at least two locking means;

each of the locking means includes a motor, a reduction gear, and a screw rod press means driven by the reduction gear; and whereby when the cassette battery set is inserted into a cavity of the hanger frame on the special chassis and positioned, the locking means are controlled by the bus-mounted control system to lock the cassette battery set on the hanger frame so as to ensure security of the bus during operating.

3. The electric public transit system of claim 1, wherein the bus-mounted control system includes at least one PLC programmable logic controller, the bus has a frame of a truss type structure, the truss type structure is formed with a whole skeleton, and a whole integral body is formed, and a hanger frame is positioned on a chassis of the frame for containing the cassette battery set, and equipped on both sides of the frame of the hanger frame with rollers, locking means, positioning means, and joint means for engaging with the loading and unloading apparatus.

4. The electric public transit system of claim 1, wherein the bus is further equipped with an auxiliary start means;

the auxiliary start means includes capacitors and an auxiliary motor, high power ratio charging and discharging characteristic of the capacitors is utilized for storing energy produced during electric braking for a use by the auxiliary motor, and the bus-mounted control system determines whether a current speed of the bus is zero or not, if the speed is accelerating from zero, the auxiliary motor is started to aid a main motor of the bus for starting the bus with a reduced starting current.

5. The electric public transit system of claim 1, wherein the bus is further equipped with a two-grade braking means;

whereby when a driver steps on a brake pedal lightly, a main motor of the bus is changed to a generator for changing inertia kinetic energy of the bus into electrical energy, which is charged into a bus-mounted capacitor for storing by a charging controller in an electric braking system; and when the driver steps on the brake pedal deeper, a pneumatic brake system is started for braking the bus, the pneumatic brake system includes a motor, an air pump and a gas container.

6. The electric public transit system of claim 4, wherein the bus is further equipped with a two-grade braking means;

whereby when a driver steps on a brake pedal lightly, a main motor of the bus is changed to a generator for changing inertia kinetic energy of the bus into electrical energy, which is charged into a bus-mounted capacitor for storing by a charging controller in an electric braking system; and when the driver steps on the brake pedal deeper, a pneumatic brake system is started for braking the bus, the pneumatic brake system includes a motor, an air pump and a gas container.

7. The electric public transit system of claim 1, wherein the cassette battery set includes a housing for containing battery units, a plurality of groups of battery units connected together by wires within the housing, and sockets placed on the housing;

the plurality of groups of battery units are spaced by partitions, each group of battery units comprises a plurality of battery units, the battery units and groups of battery units are electrically connected by wires to rods of the sockets; and the housing of the cassette battery set is further equipped with positioning means, locking means and openable covers, the positioning means and locking means are used for positioning and locking the housing on the bus respectively, and the openable covers are mounted above openings of cavities of the sockets.

8. The electric public transit system of claim 1, wherein the bus changes the cassette battery set when the discharge depth of the cassette battery set is about 60% to 80%.

9. The electric public transit system of claim 2, wherein the electrical connection means is a crocodile clamp contact means comprising a plurality of crocodile clamps and a camshaft clamp means, whereby when the camshaft clamp means is in open position, crocodile clamps are loose, and the cassette battery set is able to move into or out a cavity of the hanger frame easily, when the camshaft clamp means is in tightly clamping position, and crocodile clamps clamp rods of sockets of the cassette battery set for implementing electrical connection.

10. The electric public transit system of claim 1, wherein the charge control system is a programmable logic controller; and the programmable logic controller, based on voltage data of power grid for each period scanned by the power grid auto-trace apparatus at all period of time, controls the charger to charge cassette battery set during electrical consumption valleys of power grid and to keep float charging to cassette battery set for the rest time.

11. The electric public transit system of claim 1, wherein the charge station further includes chargers, a charging shelf for containing cassette battery sets, and a power grid auto-trace apparatus for searching electrical consumption valleys;

the chargers comprises a high-tension charger and a low-tension charger;

the charge control system is a programmable logic controller; and the programmable logic controller, based on voltage data of power grid for each period scanned by the power grid auto-trace apparatus at all period of time, controls the chargers to charge cassette battery set during electrical consumption valleys of power grid and to keep float charging to cassette battery set for the rest time.

12. The electric public transit system of claim 11, wherein the charging shelf is further equipped with a sampling means, capacity displayer for showing capacity of the cassette battery set, and a temperature measure and control means;

the temperature measure and control means can adjust temperature within the charging shelf; and the charging shelf further includes cavities for containing cassette battery sets, the charging shelf is further equipped with electrical connection means for electrically connecting with cassette battery sets, guiding wheel means, and joint means for jointing with the loading and unloading apparatus.

13. The electric public transit system of claim 11, wherein the charge station further comprises a plurality of charging shelves and a plurality of loading and unloading apparatus for implementing loading, unloading and charging cassette battery sets for a plurality of buses simultaneously.

14. The electric public transit system of claim 12, wherein the electrical connection means is a crocodile clamp contact means comprising a plurality of crocodile clamps and a camshaft clamp means, whereby when the camshaft clamp means is in open position, crocodile clamps are loose, and the cassette battery set is able to move into or out a cavity of the charging shelf easily, when the camshaft clamp means is in tightly clamping position, and crocodile clamps clamp rods of sockets of the cassette battery set for implementing electrical connection.

15. The electric public transit system of claim 9, wherein the crocodile clamp contact means includes a stator, an actor and a support shaft made of conductive metal material, a camshaft with cams made of insulating material, and a driving motor;
after the cassette battery set is inserted into the cavity for the cassette battery set in the bus and accurately positioned, the bus-mounted control system sends a signal to control the camshaft driven by the driving motor to make the stator and the actor of the crocodile clamp contact means tightly clamp the rod; and
when the cassette battery set needs change, the bus-mounted control system sends instruction to relax the crocodile clamp contact means, and then the actor is open for implementing no resistant plug-in and out of a high-tension contact section of the crocodile clamp contact means and ensuring smoothly inserting into or pulling out the cassette battery set.

16. The electric public transit system of claim 15, wherein the crocodile clamp contact means includes a high-tension contact section and a low-tension contact section;
the high-tension contact section is, after connected, for providing a high-tension power to a main motor of the bus; and
the low-tension contact section is, after connected, for providing a low-tension power to other electric appliances needing low-tension power in the bus.

17. The electric public transit system of claim 1, wherein the loading and unloading control system includes at least one PLC programmable logic controller for controlling the loading and unloading apparatus to perform exchanging of cassette battery sets; and
the loading and unloading apparatus is of a mechanical arm structure, including a moving platform, a tray, and a lift means; the lift means is for lifting the tray.

18. The electric public transit system of claim 17, wherein the mechanical arms further includes a rotating platform, a rotating mechanism and a driving means for driving the rotating platform; and
the rotating platform is placed on the moving platform, and can rotate on the moving platform so as to insert a charged cassette battery set into the bus, and/or deliver a used or broken cassette battery set to the charging shelf or a repair platform in the charge station.

19. The electric public transit system of claim 17, wherein the lift means further includes a lifting system comprising two sets of lifting arms and driving means;
the mechanical arms and the charging shelf both are placed under ground of the charge station;
while the bus is returning the charge station, one set of the lifting arms takes out a charged cassette battery set corresponding to the bus in advance, and moves to the predetermined position corresponding to the bus and waits;
when the bus stops at the predetermined position, the other set of the lifting arms takes the used cassette battery set from the bus and moves down to a layer on the charging shelf corresponding to the cassette battery set, and the one set of the lifting arms with the charged cassette battery set in arms moves close to the cavity for cassette battery set in the bus and push the charged cassette battery set in; and
the other set of the lifting arms with the used cassette battery set puts the used cassette battery set into the corresponding layer.

20. The electric public transit system of claim 18, wherein the mechanical arms further include sensors for detecting positions of the bus and the charged cassette battery sets to be taken from the charging shelf; and
sensors are placed on different positions on the mechanical arms in a lifting vertical direction and the charging shelf correspondingly, in order to position freely the tray to any layer of the charging shelf.

21. The electric public transit system of claim 1, wherein the electric public transit system further includes a control center;
the control center comprises a PC and/or at least one PLC programmable logic controller;
and the control center is placed in the charge station and can intercommunicate with the charge control system.

22. The electric public transit system of claim 21, wherein the charge control system and the control center can share same programmable logic controller.

23. The electric public transit system of claim 1, wherein the electric public transit system further includes a dispatch and rescue service system;
the dispatch and rescue service system has at least one urgent service vehicle;
the dispatch and rescue service vehicle is equipped with a bus-mounted battery carrier and a battery passage;
the battery carrier has a spare charged cassette battery set;
the battery passage has a cavity, joint arms and driving means, the battery passage is used for taking a broken cassette battery set from and inserting a spare cassette battery set into the bus; and
the joint arms and the driving means are used for jointing the battery passage with an opposite position for the housing of the cassette battery set on the chassis of the bus.

24. The electric public transit system of claim 1, wherein the electric public transit system further includes a urgent loading and unloading apparatus comprising a scissor lifting mechanism, a hydraulic driving means, a tray for cassette battery set, main wheels driven by a power means, auxiliary wheels steered by manual, and a handle;
the tray for cassette battery set is further equipped with a joint means and a moving means; and
the moving means is a fork driven by a chain, which can move the cassette battery set from a cavity for cassette battery set in the bus to the tray of the mechanical arms, or deliver the cassette battery set into the cavity for cassette battery set in the bus.

25. A method for operating an electric public transit system, comprising steps of:
- operating an electric driven bus equipped with a cassette battery set and a bus-mounted control system;
- placing a charge station in a predetermined place with cassette battery sets charged or being charged;
- sending a return signal from the bus to the charge station when the bus needs change the cassette battery set;
- moving a charged cassette battery set in the charge station to a predetermined position corresponding to the bus at the charge station, while the bus is returning to the charge station; and
- unloading the cassette battery set from the bus when the bus arrives at the predetermined position, and loading the charged cassette battery set waiting at the predetermined position into the bus;
- whereby the bus operates on line continuously;
- the method further comprising steps of:
- searching, by a power grid auto-trace apparatus, electrical consumption data of a power grid; and
- determining, by a charge control system, whether a power grid used is in valleys based on the searching data of the power grid auto-trace apparatus;
- if yes, starting a full charge program in a charger controlled by the charge control system, and charging the cassette battery set with full current until the cassette battery set is fully charged;
- if no, starting a float charge program in the charger controlled by the charge control system, and charging the cassette battery set with float current.

26. The method of claim 25, wherein the method further comprises the steps of:
- detecting the working state of battery units in the cassette battery set;
- detecting, when a battery unit or a group of battery units in the cassette battery set are detected being unable to work, whether the rest of battery units in the cassette battery set is able to support the bus to return the charge station;
- if yes, sending warning signal to a driver of the bus to drive the bus to the charge station; and
- if no, sending out rescue signal to the charge station.

27. A method for charging the cassette battery sets of the electric transit system of claim 1, comprising steps of:
- reading data of the cassette battery set by the charge control system;
- determining whether a power grid used is in valleys or not based on the electrical consumption data of the power grid searched by the power grid auto-trace apparatus;
- if yes, charging the cassette battery set with full current until the cassette battery set is fully charged, and then charging the cassette battery set with float current when the cassette battery set is determined having been fully charged; and
- if no, charging the cassette battery set with float current;
- whereby the cassette battery set is being charged at least with float current all the time except being used in the bus.

* * * * *